US007463789B2

(12) United States Patent
Myochin

(10) Patent No.: US 7,463,789 B2
(45) Date of Patent: Dec. 9, 2008

(54) IMAGE-PROCESSING DEVICE, ITS METHOD, ITS PROGRAM AND RECORDING MEDIUM STORING THE PROGRAM

(75) Inventor: Kiyonori Myochin, Tokyo (JP)

(73) Assignees: Pioneer Corporation, Tokyo (JP); Pioneer Design Corporation, Tokyo (JP)

( * ) Notice: Subject to any disclaimer, the term of this patent is extended or adjusted under 35 U.S.C. 154(b) by 704 days.

(21) Appl. No.: 10/934,739

(22) Filed: Sep. 7, 2004

(65) Prior Publication Data

US 2005/0053310 A1 Mar. 10, 2005

(30) Foreign Application Priority Data

Sep. 8, 2003 (JP) ............................ 2003-315577

(51) Int. Cl.
*G06K 9/36* (2006.01)

(52) U.S. Cl. ....................... 382/284; 382/245; 382/299; 382/260; 345/592; 345/611; 345/631; 345/555; 375/240.01; 375/240.12; 375/240.21; 348/452; 348/473; 348/559

(58) Field of Classification Search ................. 382/284, 382/245, 299; 345/592, 611, 631, 555, 629; 375/240.01, 240.21, 240.12, 240.14; 348/304, 348/452, 559
See application file for complete search history.

(56) References Cited

U.S. PATENT DOCUMENTS 5,020,118 A * 5/1991 Sugiura ...................... 382/318
5,038,218 A * 8/1991 Matsumoto ................. 358/296
5,216,755 A * 6/1993 Walker et al. ............... 345/591
5,289,566 A * 2/1994 Walker et al. ............... 345/592
6,219,454 B1 * 4/2001 Kawano et al. ............. 382/232
6,441,913 B1 * 8/2002 Anabuki et al. ............ 358/1.12
6,647,061 B1 * 11/2003 Panusopone et al. ... 375/240.12
6,938,030 B1 * 8/2005 Simone et al. ................. 707/1
7,085,020 B2 * 8/2006 Trelewicz ............. 358/426.13
7,202,876 B2 * 4/2007 Fushiki et al. ............. 345/592

(Continued)

FOREIGN PATENT DOCUMENTS

JP 5-27734 2/1993
JP 2002-305651 10/2002

OTHER PUBLICATIONS

European Search Report dated Feb. 21, 2006.

*Primary Examiner*—Samir A Ahmed
*Assistant Examiner*—Nancy Bitar
(74) *Attorney, Agent, or Firm*—Kratz, Quintos & Hanson, LLP

(57) ABSTRACT

An image-processing device (130) includes a data access section (131) that reads composite image data (10) having one data structure in which a plurality of image data are combined, and a controller (136) that selects predetermined image data from the composite image data (10) and displays only the selected image data on a display section (140). With the above configuration, a plurality of image data are organized in one composite image data (10) to thereby significantly reduce the image data size. Therefore, in such a device as having limited capacity for saving image data or the like, such as a car navigation, mobile phone, or other devices having a small-sized movie display section, a number of images can be displayed by using the composite image data in which a plurality of image data are combined.

14 Claims, 16 Drawing Sheets

U.S. PATENT DOCUMENTS 7,382,937 B2 * 6/2008 Miller et al. ................ 382/284
2001/0017593 A1 * 8/2001 Saunders et al. .............. 341/50
2003/0107583 A1 * 6/2003 Fushiki et al. .............. 345/611
2003/0118238 A1 6/2003 Martinez-Uriegas et al. .............. 382/232

* cited by examiner

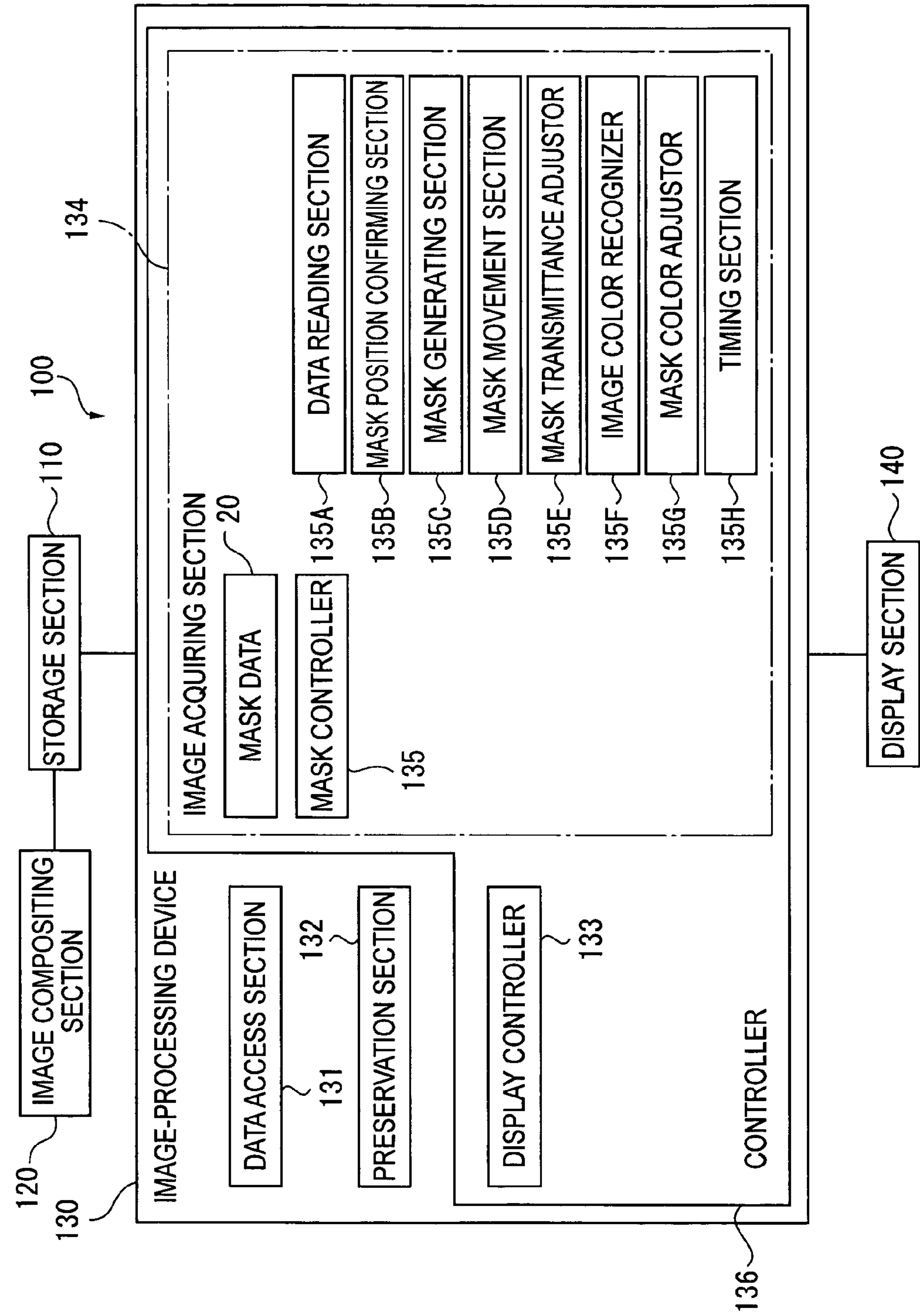
FIG. 1
100
IMAGE COMPOSITING SECTION
120
STORAGE SECTION
110
DISPLAY SECTION
140
IMAGE-PROCESSING DEVICE
130
DATA ACCESS SECTION
131
PRESERVATION SECTION
132
DISPLAY CONTROLLER
133
CONTROLLER
136
IMAGE ACQUIRING SECTION
134
MASK DATA
20
MASK CONTROLLER
135
DATA READING SECTION
135A
MASK POSITION CONFIRMING SECTION
135B
MASK GENERATING SECTION
135C
MASK MOVEMENT SECTION
135D
MASK TRANSMITTANCE ADJUSTOR
135E
IMAGE COLOR RECOGNIZER
135F
MASK COLOR ADJUSTOR
135G
TIMING SECTION
135H

A
B
101
A-1
A-2
A-3
A-4
B-1
B-2
B-3
B-4
10
1A
1B
A-1
A-3
A-5
A-7
B-2
B-4
B-6
B-8

FIG.5
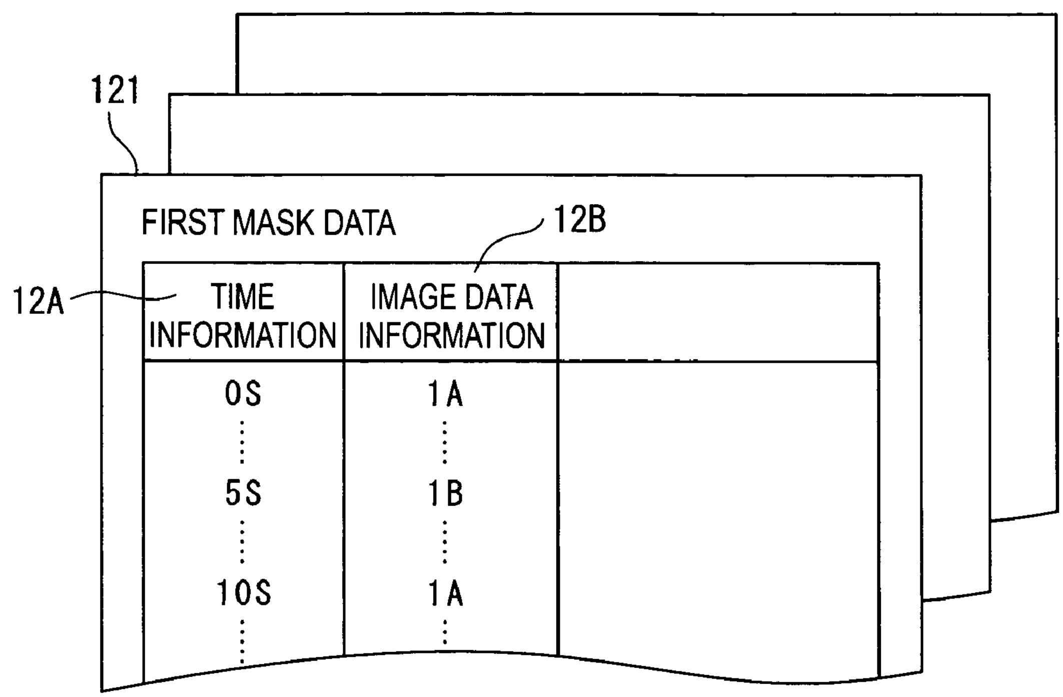
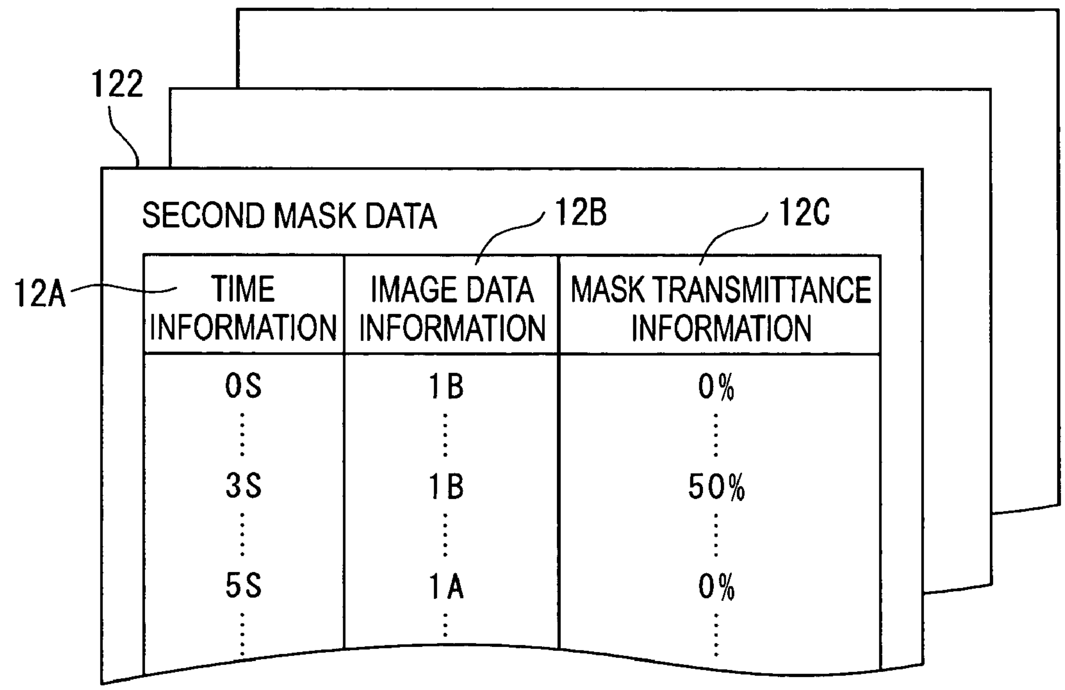

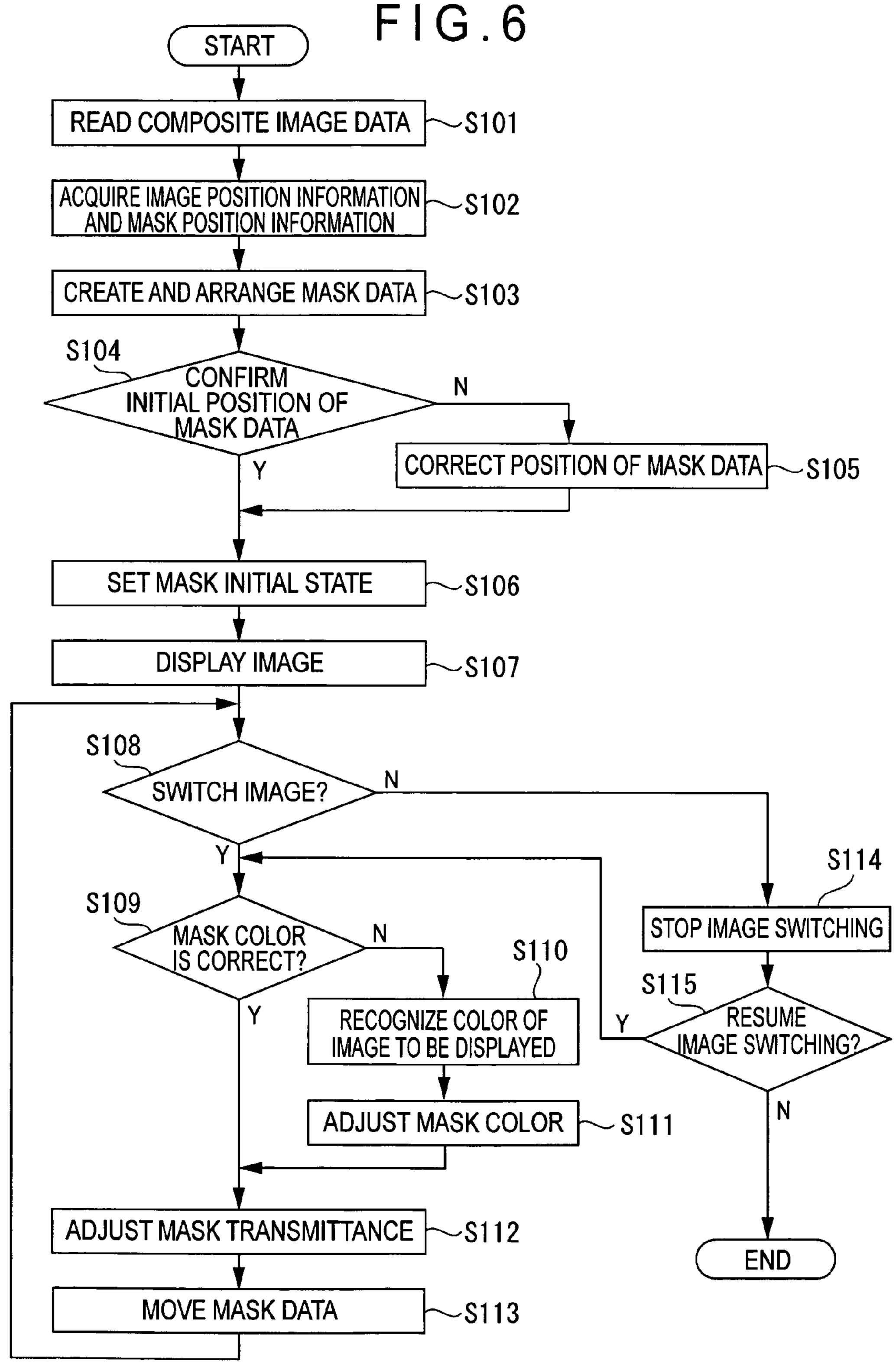
FIG. 6
START
READ COMPOSITE IMAGE DATA
S101
ACQUIRE IMAGE POSITION INFORMATION AND MASK POSITION INFORMATION
S102
CREATE AND ARRANGE MASK DATA
S103
S104
CONFIRM INITIAL POSITION OF MASK DATA
N
Y
CORRECT POSITION OF MASK DATA
S105
SET MASK INITIAL STATE
S106
DISPLAY IMAGE
S107
S108
SWITCH IMAGE?
N
Y
S109
MASK COLOR IS CORRECT?
N
Y
S110
RECOGNIZE COLOR OF IMAGE TO BE DISPLAYED
ADJUST MASK COLOR
S111
S114
STOP IMAGE SWITCHING
S115
RESUME IMAGE SWITCHING?
Y
N
END
ADJUST MASK TRANSMITTANCE
S112
MOVE MASK DATA
S113

200
STORAGE SECTION
110
IMAGE COMPOSITING SECTION
120
230
IMAGE-PROCESSING DEVICE
DATA ACCESS SECTION
131
PRESERVATION SECTION
132
DISPLAY CONTROLLER
133
CONTROLLER
236
234
IMAGE ACQUIRING SECTION
MASK DATA
220
MASK CONTROLLER
235
DATA READING SECTION
135A
MASK GENERATING SECTION
235C
MASK TRANSMITTANCE ADJUSTOR
235E
IMAGE COLOR RECOGNIZER
135F
MASK COLOR ADJUSTOR
235G
TIMING SECTION
135H
DISPLAY SECTION
140

60
61
62
63
64

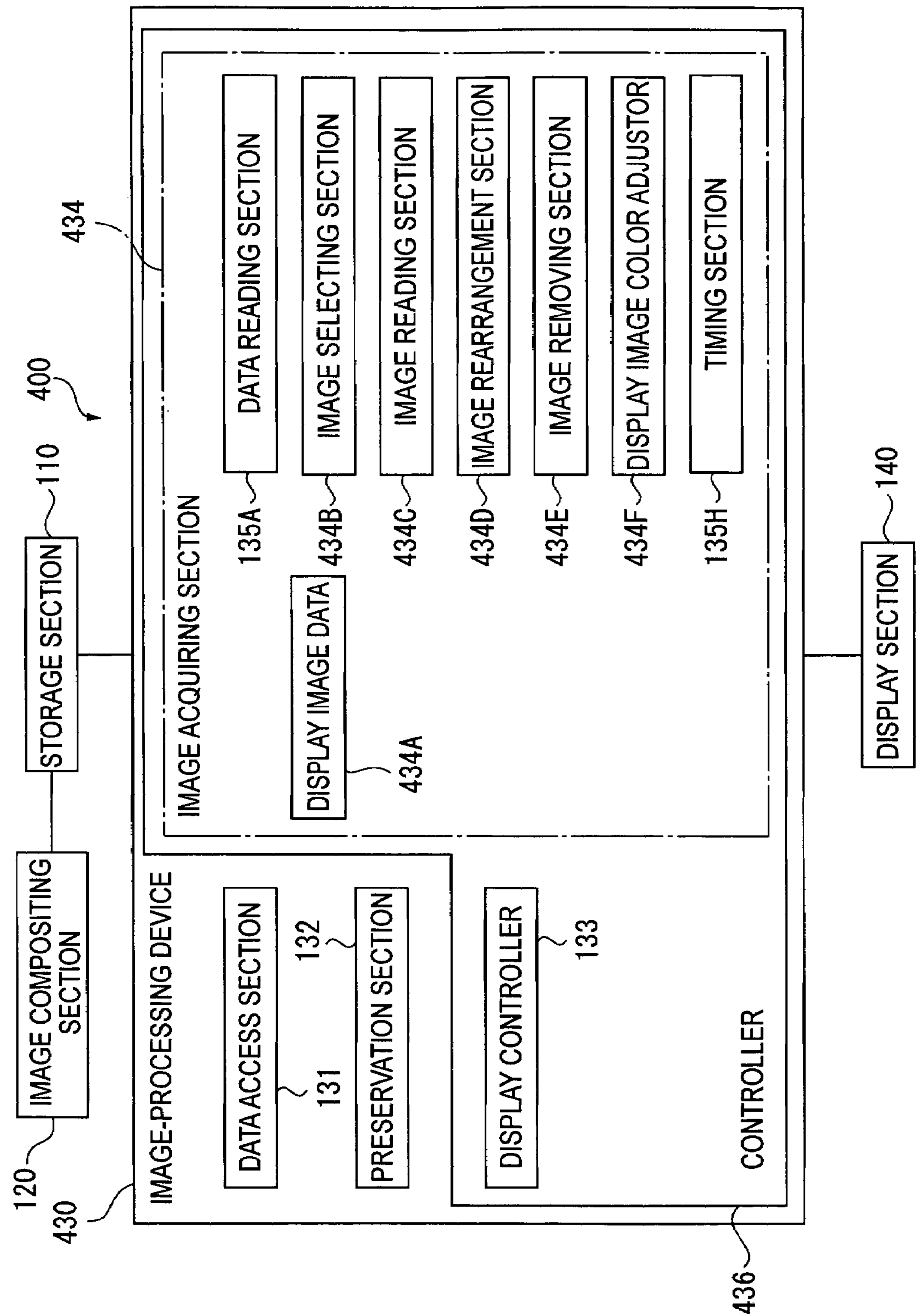
FIG. 12
400
110
STORAGE SECTION
120
IMAGE COMPOSITING SECTION
430
IMAGE-PROCESSING DEVICE
DATA ACCESS SECTION
131
132
PRESERVATION SECTION
DISPLAY CONTROLLER
133
CONTROLLER
436
434
IMAGE ACQUIRING SECTION
DISPLAY IMAGE DATA
434A
135A
DATA READING SECTION
434B
IMAGE SELECTING SECTION
434C
IMAGE READING SECTION
434D
IMAGE REARRANGEMENT SECTION
434E
IMAGE REMOVING SECTION
434F
DISPLAY IMAGE COLOR ADJUSTOR
135H
TIMING SECTION
140
DISPLAY SECTION

900

IMAGE-PROCESSING DEVICE, ITS METHOD, ITS PROGRAM AND RECORDING MEDIUM STORING THE PROGRAM

BACKGROUND OF THE INVENTION

1. Field of the Invention

The present invention relates to an image-processing device that displays a plurality of image data, its method, its program, and a recording medium storing the program.

2. Description of Related Art

Conventionally, image-processing devices configured to sequentially read a plurality of images and display the images one after another, for example, have been known as the image-processing devices that display images on the screen of, for example, a car navigation system. Such image-processing devices previously store a plurality of image data in a storage area, and sequentially read desired image data so as to display the images one after another on a screen. Further, the configuration in which a plurality of the image data are thus sequentially read and displayed allows moving pictures to be displayed.

However, the conventional image-processing device as described above needs to previously store a plurality of image data in a storage area. In order to store a plurality of image data, a relatively large-capacity storage area is required. Further more, when the amount of the image data is increased, or quality of the image is enhanced, even larger storage area is correspondingly required. Particularly, in a small-sized device such as a car navigation or mobile phone, a large-capacity storage area cannot be reserved. Alternatively, the storage area must be assigned for storage of the essential system parts, reducing the storage area for storing the image data. Therefore, the conventional image-processing device cannot store a large amount of image data. In order to cope with this problem, a complexity of the device configuration, or increase in the device size is unavoidable.

SUMMARY OF THE INVENTION

A main object of the present invention is to provide an image-processing device capable of easily displaying a plurality of image data, its system, and its method.

An image-processing device according to an aspect of the present invention includes: a reading section for reading composite image data, which is formed as one data structure by combining a plurality of image data; and a controller for selecting predetermined image data from the composite image data and displaying only the selected image data on a display section.

An image-processing method according to another aspect of the present invention includes: reading composite image data, which is formed as one data structure by combining a plurality of image data; and selectively displaying only predetermined image data of the image data included in the composite image data that has been read.

An image-processing program according to a further aspect of the present invention allows a computing section to execute the image-processing method.

A recording medium according to still another aspect of the present invention stores the image-processing program in a manner readable by a computer.

BRIEF DESCRIPTION OF THE DRAWINGS

FIG. 1 is a block diagram schematically showing a configuration of an image-processing device according to a first embodiment of the present invention;

FIG. 5 is table describing another of the data used in the image-processing device according to the first embodiment;

FIG. 6 is a flowchart showing operations of the image-processing device according to the first embodiment;

FIG. 12 is a block diagram schematically showing a configuration of the image-processing device according to a fourth embodiment;

DETAILED DESCRIPTION OF PREFERRED EMBODIMENTS

Embodiments according to an image-processing device of the present invention will be described below with reference to attached drawings.

First Embodiment

A configuration that switches background images displayed on a display unit of, for example, a car navigation or mobile phone will be described as an image-processing device according to the first embodiment. The image-processing device according to the present invention is applicable to monitor background images switching not only for small-sized devices such as a car navigation or mobile phone, but also for a personal computer or other types of image display devices having a monitor.

Figure 2:
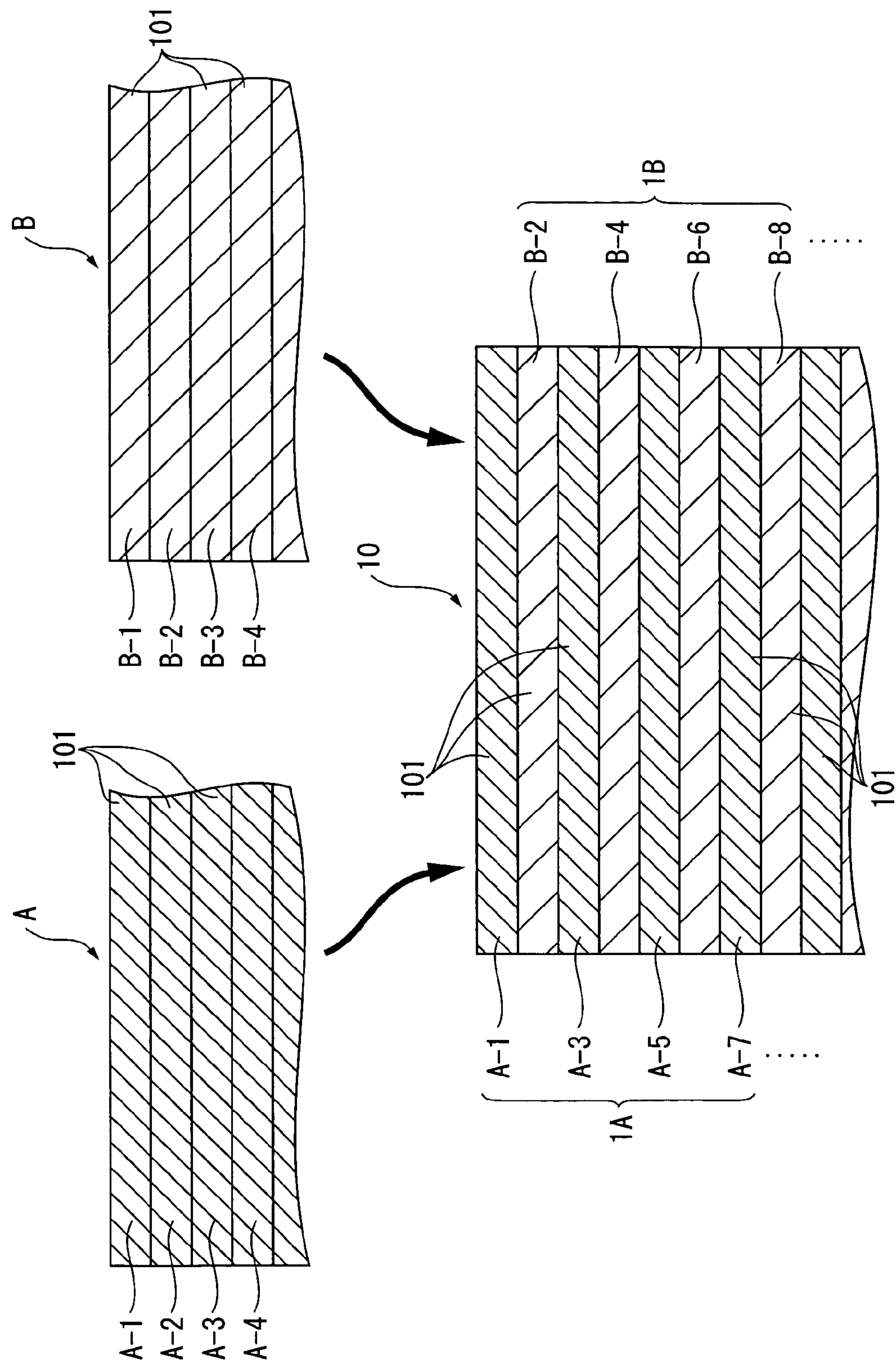
FIG. 2 shows a part of composite image data according to the first embodiment.
Figure 3:
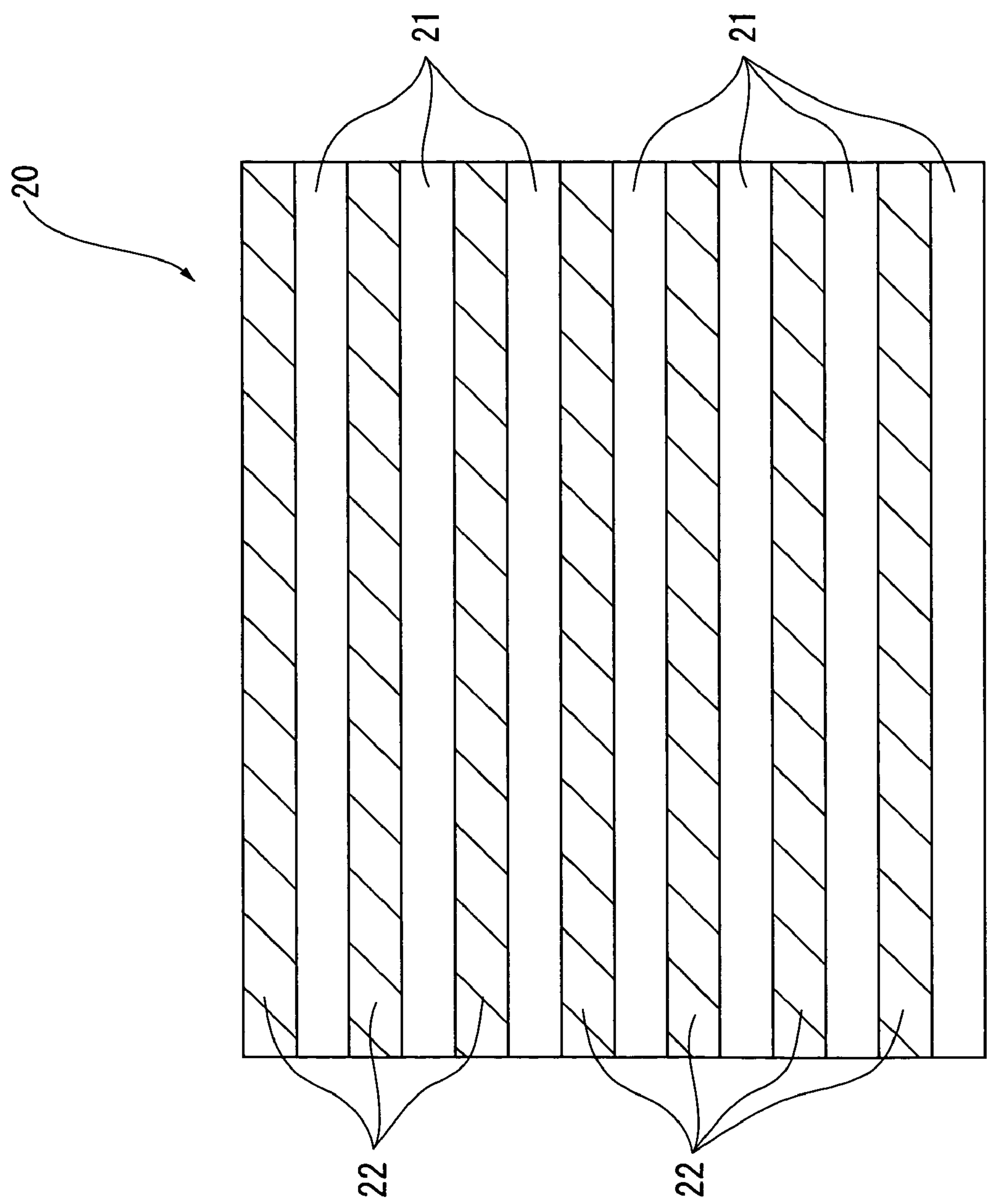
FIG. 3 shows a part of an image filter section according to the first embodiment.
Figure 4:
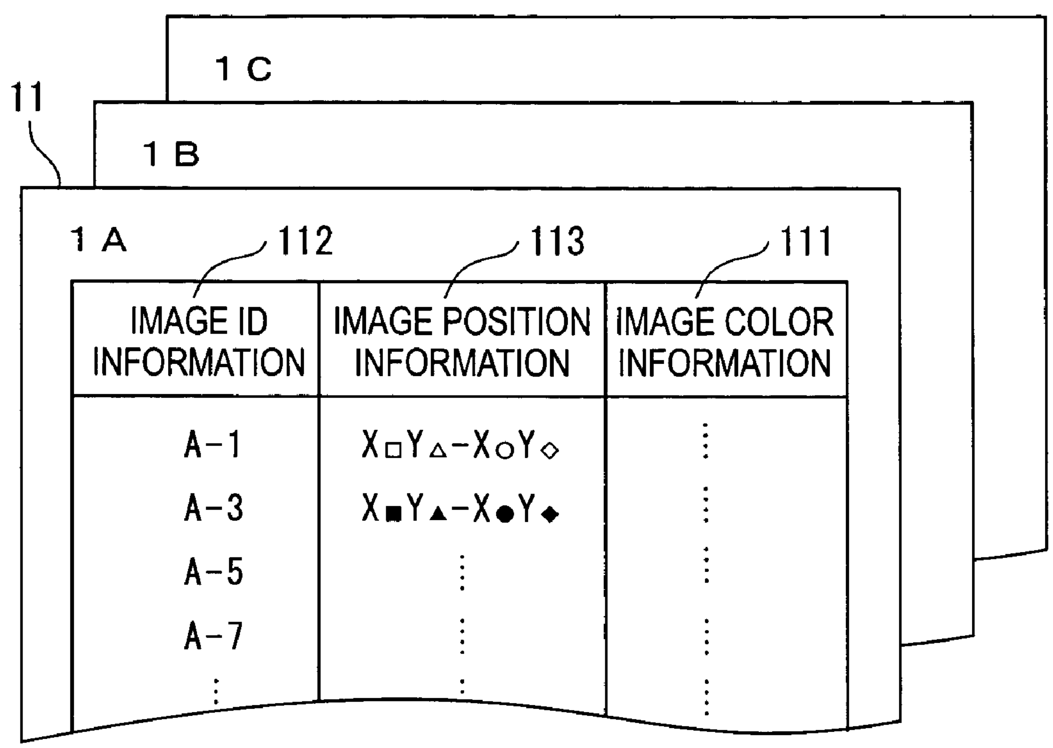
FIG. 4 is a table describing one of the data used in the image-processing device according to the first embodiment.

The image-processing device according to the first embodiment will be described with reference to FIGS. 1 to 6. FIG. 1 is a block diagram schematically showing a configuration of an image display device to which the image-processing device according to the first embodiment is attached. FIG. 2 shows a part of composite image data. FIG. 3 shows a part of an image filter section. FIG. 4 schematically shows an image position information table describing image data information related to the composite image data. FIG. 5 schematically shows mask position information tables describing position information related to the image filter section. FIG. 6 is a flowchart showing operations of the image-processing device.

[Configuration of Image Display Device]

In FIG. 1, reference numeral 100 denotes an image display device. The image display device 100 includes a storage section 110 that stores composite image data 10 (see FIG. 2) or other information, an image compositing section 120 that serves as a composite image data generator for generating composite image data 10, an image-processing device 130 that acquires predetermined image data from the composite image data 10, and a display section 140 that displays the image data acquired by the image-processing device 130.

The storage section 110 records data on a recording medium such as a hard disk, a DVD (Digital Versatile Disk), or a memory card, and has a drive into or from which the recording medium can be inserted/ejected. Various information including the composite image data 10 shown in FIG. 2, an image position information table 11 shown in FIG. 4, a mask position information table 12 shown in FIG. 5, and the like are stored in the recording medium.

The display section 140 displays the image data sent from the image-processing device 130 on a display unit. As the display section 140, a monitor of a personal computer, a display unit of a car navigation, a liquid crystal screen of a mobile phone, and the like can. be used.

The image-processing device 130 includes a data access section 131 serving as a reading unit for reading data from the storage section 110, a data preservation section 132, and a controller 136 that selectively displays, on the display section 140, only predetermined image data included in the composite image data 10.

The controller 136 further includes an image acquiring section 134 that acquires predetermined image data from the composite image data 10 and a display controller 133 that allows the display section 140 to display the acquired image data.

The image acquiring section 134 includes mask data 20 (see FIG. 3) serving as a filter section and a mask controller 135 serving as a filter controller for controlling the mask data 20.

[Data Structure of Composite Image Data]

A data structure of the composite image data 10 stored in the storage section 110 will next be described below with reference to FIG. 2.

FIG. 2 shows a part of the displayed composite image data 10 used in the image-processing device according to the first embodiment. In the state shown in FIG. 2, image data A and B have not been combined with each other.

In the state of being displayed, image data A and B have a data structure constituted by a plurality of constitutional image data 101 having a substantial stripe shape. To the constitutional image data 101, numbers are sequentially assigned, respectively. Assuming that the image data A is constituted by the constitutional image data 101 having a substantial stripe shape as shown in FIG. 2, numbers of A-1, A-2, A-3 . . . are assigned to the constitutional image data 101 starting from the edge in the order mentioned. Similarly, it is assumed that the image data B is constituted by the constitutional image data 101 having a substantial stripe shape. In this case, numbers of B-1, B-2, B-3 . . . are assigned to the constitutional image data 101 from the above in the order mentioned.

The composite image data 10 has a structure in which the constitutional image data of these image data A and B are alternately arranged in numerical sequence. That is, as shown in FIG. 2, the constitutional image data 101 of the image data A and B are arranged in the order of A-1, B-2, A-3, B-4, A-5 . . . to form the composite image data 10. As described above, the composite image data 10 is constituted by image data 1A including A-1, A-3, A-5 of all the constitutional image data 101 that constitute the image data A, and image data 1B including B-2, B-4, B-6 . . . of all the constitutional image data 101 that constitute the image data B.

In the above state, the smaller the stripe width of the constitutional image data 101 becomes, the smaller the interval between the image data 1A and the next image data 1A becomes, so that more detailed image can be displayed.

While the composite image data 10 is constituted by the image data A and B in the first embodiment, the composite image data 10 may be constituted by much more data. Further, such composite image data 10 for use in the image-processing device may be one or more.

The above composite image data 10 is formed by the image compositing section 120. After acquiring a plurality of image data, the image compositing section 120 breaks the image data into constitutional image data 101. After that, the image compositing section 120 sequentially assigns numbers to the constitutional image data 101, and selects the constitutional image data 101 having predetermined numbers, which are then alternately arranged in numerical sequence, thereby forming the composite image data 10.

The composite image data 10 has a size substantially equal to a size of the original image data. For example, the size of the composite image data 10 shown in FIG. 2 substantially corresponds to that of the image data A or image data B. By forming the composite image data 10 in this manner, a plurality of image data can be integrated in the size that corresponds to one image data.

Information related to the image data 1A and 1B of the above composite image data 10 is stored, as an image position information table 11 shown in FIG. 4, in the storage section 110. One image position information table 11 is created for one image data, for example. The image position information table 11 includes image ID information 112, image position information 113, and image color information 111, which are related to each other. The image ID information 112 is information added for each image data, and is identification information indicating to which image data respective constitutional image data 101 belongs. The image position information 113 indicates the coordinate positions of the constitutional image data 101 on the composite image data 10. The image color information 111 indicates the colors of the constitutional image data 101. It is sufficient for the image color information 111 to indicate the general tone of the colors of the constitutional image data 101.

[Data Structure of Mask Data]

The mask data 20 used in the first embodiment will next be described with reference to FIG. 3.

As shown in FIG. 3, the mask data 20 includes stripe-shaped first mask data 21 and second mask data 22, which are arranged in correspondence to the substantially stripe-structured constitutional image data 101 of the composite image data 10.

The first and second mask data 21 and 22 recognize the shape and position of the constitutional image data 101 based on the image position information 113 of each image data described in the image position information table 11, and thereby mask data 21 and 22 have substantially the same size as the constitutional image data 101. The first and second mask data 21 and 22 are superposed on the composite image data 10 for each constitutional image data 101.

The first mask data 21 is a blank portion that allows the image data in the composite image data 10 to be visible at all times. In other words, superposition of the first mask data 21 is equivalent to a state where no mask data are superposed. On the other hand, the transmittance of the second mask data 22 can be controlled by the mask controller 135. Therefore, high transmittance of the second mask data 22 allows the image data to be visible, whereas the low transmittance obscures the image data.

The configuration of the mask data 20 is changed in accordance with the number of the image data that constitute the composite image data 10. When, for example, four image data constitute the composite image data, the first mask data that always allow the image data to be visible, and second, third, and fourth mask data whose transmittance are changeable may be created. The second to fourth mask data may be independent from each other. In this case, transmittance of the second to fourth mask data can be changed at different times.

Mask position information tables 12 shown in FIG. 5 are so created as to correspond to, for example, the first mask data 21 and second mask data 22. A mask position information table 121 of the first mask data 21 includes, for example, time information 12A and image data information 12B that indicates image data to be superposed at the time indicated by the time information 12A. On the other hand, a mask position information table 122 of the second mask data 22 includes, in addition to the time information 12A and image data information 12B, mask transmittance information 12C of the second mask data 22 at a predetermined time.

A set of the above mask position information tables 12 is created for each composite image data 10. That is, the mask position information table 12 may be created in accordance with the number of the composite image data 10. Alternatively, the mask position information table 12 may be created based on the image position information table 11 of the respective composite image data 10 after the creation of basic information. For example, the mask position information table 12 describing time information 12A and mask transmittance information 12C is prepared as the basic information. The mask position information table 12 then reads the image position information table 11, and creates image data information 12B based on the image ID information 112 and image position information 113 included in the image position information table 11. This eliminates a need to prepare the mask position information table 12 for each composite image data 10.

The mask position information table 12 is editable by a user, so that the user can control the display order of the image, display speed, switching speed of the image, or the like. Accordingly, it is possible to edit the mask position information table 12 serving as the basic information. This allows a creation of user-customized mask position information table 12 through editing of the basic information while reducing the number of mask position information tables.

[Configuration of Image-processing Device]

A detailed configuration of the image-processing device 130 will next be described with reference to FIG. 1. The image-processing device 130 includes, as described above, the data access section 131, preservation section 132, and controller 136. The controller 136 further includes an image acquiring section 134 having the mask data 20 and a mask controller 135, and a display controller 133.

The data access section 131 reads information such as the composite image data 10 or image position information table 11 stored in the storage section 110, and can write new data into the storage section 110 when the storage section 110 is a rewritable recording medium such as a hard disk. An external connection section (not shown) which allows the image-processing device 130 to establish communication with an external device is provided for writing of new data into the storage section 110 or editing of the existing data.

The preservation section 132 can temporarily store the composite image data 10 that has been read by the data access section 131 and other information. As the preservation section 132, a recording medium such as a memory or cache can be selected for use. The composite image data 10, image position information table 11 or the like temporarily stored in the preservation section 132 is in a standby state, where the stored data can promptly be taken from the preservation section 132. This eliminates a need to newly perform reading of data into the storage section 110 when a need of, for example, switching the composite image data 10 arises.

The display controller 133 allows the display section 140 to display the image data acquired by the image acquiring section 134. As described above, a monitor of a personal computer, a liquid crystal screen of car navigation, or a mobile phone, and the like can be used as the display section 140. If a high-resolution display such as a monitor of a personal computer is used as the display section 140, the composite image data 10 with a large stripe width may deteriorate the image quality. In order to cope with this problem, it is only necessary that the stripe width of the constitutional image data 101 that constitute the composite image data 10 be made small. On the other hand, in the case of a relatively low-resolution display such as a liquid crystal display of car navigation, or mobile phone is used as the display section 140, the problem of image deterioration hardly occurs even for the image with a large stripe width. In this manner, the stripe width, image size or the like of the composite image data 10 used in the image-processing device 130 can be freely set depending on the intended use of the display section 140, recording capacity of the storage section 110, or the like.

[Configuration of Image Acquiring Section]

A more detailed description will be given of the configuration of the image acquiring section 134. As described above, the image acquiring section 134 includes the mask data set 20 and mask controller 135.

The mask controller 135 includes a data reading section 135A, a mask generating section 135C that generates the mask data, a mask position confirming section 135B that confirms the position of the mask data 20, a mask movement section 135D that moves the mask data 20, a mask transmittance adjustor 135E that changes the transmittance of the second mask data 22 that constitute the mask data 20, a mask color adjustor 135G that adjusts the color of the second mask data 22, and a timing section 135H that allows the mask data 20 to be moved and the transmittance of the second mask data 22 to be adjusted at a predetermined time.

The data reading section 135A reads the aforementioned image position information table 11 of the composite image data 10 and mask position information table 12 from the preservation section 132. The composite image data 10, the image position information table 11 and mask position information table 12 read into the data reading section 135A allows the image acquiring section 134 to grasp the positions of the respective constitutional image data 101 in the composite image data 10.

The mask generating section 135C generates mask data 20 to be superposed on the composite image data 10 for each constitutional image data 101. As described above, the positions and sizes of the constitutional image data 101 in the composite image data 10 are recognized from the image ID information 112 and image position information 113 included in the image position information table 11 that has been read by the data reading section 135A. The first mask data 21 and second mask data 22 having a size substantially equal to the size of the constitutional image data 101 are then created, followed by being superposed on the constitutional image data 101.

The mask position confirming section 135B determines whether the positional relationship between the mask data 20 created by the mask generating section 135C and the composite image data 10 is correct or not. More specifically, the mask position confirming section 135B compares the image position information table 11 and mask position information table 12 so as to confirm whether the mask data 20 is disposed at the position specified in the table information at a predetermined time.

The mask movement section 135D can adjust the position of the mask data 20 with respect to the composite image data 10. The mask movement section 135D moves the mask data 20 to correct position based on the mask position information table 12. When the mask movement section 135D moves the mask data 20, the first and second mask data 21 and 22 accordingly move, so that the positions of the first and second mask data 21 and 22 are switched with each other. In the case of the composite image data 10 as shown in FIG. 2, movement of the mask data 20 substantially along the arrangement direction of the stripe-shaped constitutional image data 101 can switch the image data to be displayed.

The mask transmittance adjustor 135E can adjust the transmittance of the second mask data 22. When the transmittance of the second mask data 22 is lowered, the image data that is superposed by the second mask data 22 is made invisible. Accordingly, in this case, only the image data that is superposed by the first mask data 21 can be seen. It follows that the movement mask data 20 with low transmittance of the second mask data 22 to the position of the image data that has been superposed by the first mask data 21 achieves image switching. Further, the mask transmittance adjustor 135E can adjust the speed at which the transmittance is changed. A successive change in the transmittance can gradually change the state of the second mask data 22 to make the image data that is superposed by the second mask data 22 visible or invisible.

For example, it is assumed that the image data 1A has reddish color and the second mask data 22 have blackish color as a whole. In this case, the image data 1A that is allowed to be visible may look bad due to the boldness of the color of the second mask data 22 serving as mask data. In order to cope with the case, the mask color adjustor 135G and image color recognizer 135F are provided. The mask color adjustor 135G can adjust the color of the second mask data 22 to the color substantially the same as that of the constitutional image data 101 of the image data that is being displayed.

The image color recognizer 135F refers to image color information 111 corresponding to the image ID information 112 of the respective image data described in the image position information table 11, at first, to recognize the colors of the constitutional image data 101. Then the image color recognizer 135F determines the colors of the respective second mask data 22 corresponding to the respective constitutional image data 101 based on the image color information 111.

The mask color adjustor 135G adjusts the color of the second mask data 22 to the color determined by the image color recognizer 135F. The mask color adjustor 135G can change the color of each second mask data 22 to be superposed on the each constitutional image data 101.

The timing section 135H manages the above control over the mask data 20 by time and serves for repetitive switching of the image data. The timing section 135H includes a timer (not shown). The timing section 135H compares the time indicated by the timer and time information 12A described in the mask position information table 12, and sends signals to each section of the mask controller 135 at a predetermined time.

[Operations of Image-processing Device According to First Embodiment]

Operations of the above image-processing device 130 will next be described with reference to FIG. 6.

In FIG. 6, when the image-processing device 130 is started, the image acquiring section 134 reads, from the storage section 110 though the data access section 131, the composite image data 10, image position information table 11, and mask position information table 12, which are then once stored in the preservation section 132 (step S101). When there are a plurality of composite image data 10, corresponding image position information tables 11 and mask position information tables 12 in the storage section 110, all the data may be read and stored in the preservation section 132 at a time, or some of the data may be read and stored in the preservation section 132.

Then, the data reading section 135A of the image acquiring section 134 reads the necessary composite image data 10, image position information table 11, and mask position information table 12 from the data stored in the step S101 (step S102).

The mask generating section 135C identifies the positions of the constitutional image data 101 of the image data based on the image ID information 112 and image position information 113 described in the image position information table 11 that have been read in the step S102. The mask generating section 135C then generates and combines the first mask data 21 and second mask data 22 to be superposed on the respective constitutional image data 101 to form the mask data 20 (step S103).

The mask position confirming section 135B confirms whether the mask data 20 created in the step S103 is correctly disposed (step S104). The position of the mask data 20 is confirmed by comparison between the mask position information table 12 and the image position information 113. When it is determined, in the step Si 04, that the position of the mask data 20 is not correct, the mask movement section 135D is used to move the mask data 20 to the correct position (step S105).

Thereafter, an initial state of the mask data 20 is determined based on the image data information 12B and mask transmittance information 12C in the start time indicated by the time information 12A of the mask position information table 12 (step S106). For example, it is assumed that the image data information 12B in the start time indicated by the time information 12A describes that the first mask data 21 are superposed on the image data 1A, and second mask data 22 are superposed on the image data 1B with the minimum transmittance. In this case, at first, the image ID information 112 and image position information 113 described in the image position information table 11 are referred to, and the positions of the image data 1A and 1B are confirmed. In accordance with the description of the mask position information table 12, the first and second mask data 21 and 22 are superposed on the image data 1A and 1B, respectively. After that, the mask transmittance adjustor 135E sets the transmittance of the second mask data 22 to the minimum value.

On the determination of the initial state in the step S105, the mask color adjustor 135G adjusts the colors of the second mask data 22. More specifically, the image color recognizer 135F acquires the image color information 111 corresponding to respective image ID information 112 from the image position information table 11. The colors of the second mask data 22 are then determined based on the image color information 111. Thereafter, the mask color adjustor 135G adjusts the colors of the second mask data 22 to correspond to the respective constitutional image data 101 of each image data.

The composite image data 10 that has been subjected to initial processing in the step S105 is displayed on the display section 140 by the display controller 133 (step S107). At this time, the image at, for example, time unit 0 in the start time is displayed on the display section 140, and, at the same time, the timer of the timing section 135H is set to operate. When the timer has reached a predetermined time specified by the time information 12A of the mask position information table 12, it is determined whether image switching is executed or not (step S108). Note that the time information 12A may represent the aforementioned time unit, that is, time unit corresponding to a clock signal or the like, in addition to the time unit such as hour, minute, second or the like.

When it has been determined to execute image switching in the step S108, the image color recognizer 135F confirms whether the colors of the second mask data 22 and image color information 111 of the image position information table 11 correspond to each other (step S109). More specifically, in the step S109, the image color recognizer 135F first recognizes the colors of the current image data and the next image data from the image color information 111 and image data information 12B. When the current and next image data are different from each other, the colors of the second mask data 22 are adjusted. On the other hand, in the case where the two image data resemble in color even when the two image data are different from each other, or where the two image data are the same, color adjustment of the second mask data 22 is not executed.

In the step S109, when it is determined that the color adjustment needs to be executed, the image color recognizer 135F determines the colors of the second mask data 22. At this time, the image color recognizer 135F refers to image color information 111 of the next image data (step S110).

The color information of the second mask data 22 determined in the step S110 is sent to the mask color adjustor 135G. Based on the color information, the mask color adjustor 135G adjusts the colors of the respective second mask data 22 corresponding to image ID information 112 (step S111).

After the colors of the second mask data 22 are adjusted in the steps S109 to S111, the mask transmittance adjustor 135E adjusts the transmittance of the second mask data 22 (step S112). More specifically, in the step S112, the time information 12A and mask transmittance information 12C of the mask position information table 12 are used for reference to adjust the transmittance of the second mask data 22.

As describe above, the mask transmittance adjuster 135E can successively change the transmittance in the step S112. This allows, for example, fade-in and fade-out expression of the image data.

After that, the mask movement section 135D moves the first mask data 21 such that the first mask data 21 are superposed on the next image data (step S113). In the step S113, the mask data 20 is moved crosswise to the stripe direction. The movement of the mask data 20 is performed also based on the comparison between the mask position information table 12 including the time information 12A and image data information 12B, and image position information table 11 including the image ID information 112 and image position information 113. Further, the distance of the movement is determined also based on the data described in the mask position information table 12 and image position information table 11.

After the mask data 20 is moved in the step S113, the operation returns to the step S108, where it is determined whether image switching is continued or not.

When it is determined, in the step S108, that the image switching is not executed, stop processing for image switching is executed (step S114). As a result, the currently displayed image can continue to be displayed. In this state, the image switching can be resumed any time, otherwise, it is possible to terminate the image display (step S115).

The operations from the steps S108 to S113 are automatically switched between them at a predetermined time under the control of the timing section 135H. Therefore, in the case where the image data that constitute the composite image data 10 are related with each other, repetition of the above image switching allows a series of moving pictures to be displayed. When the speed or timing at which the image is switched is controlled, expression or display speed of the moving pictures can be changed. Further, editing of the information of the mask position information table 12 or preparation of a plurality of mask position information tables 12 allows various patterns of the moving pictures to be selected and displayed.

Image switching operation from the image data IA to image data 1B will be described as an example of image switching operation from the steps S108 to S113. It is assumed that only the image data 1A is displayed on the display section 140. The image acquiring section 134 executes image switching operation based on the time information 12A and image data information 12B of the mask position information table 12. Several assumptions are further made as follows: • The first mask data 21 are superposed on the image data 1A from time 0 to time x, and the second mask data 22 are superposed on the image data 1B from time 0 to time y, according to the time information 12A. • It is specified that the transmittance of the second mask data 22 is gradually increased from minimum value up to maximum value between time y and time x ($0<y<x$). • After that, the first mask data 21 are superposed on the image data 1B from time x to time z, and the second mask data 21 are superposed on the image data 1A from time x to time w with the transmittance thereof gradually decreased from the maximum to minimum value. • The transmittance of the second mask data 22 is maintained at the minimum value between time w and time z ($x<w<z$).

In the case described above, it is determined at first that the colors of the second mask data 22 are changed or not, in the step S109. The image data 1A that is displayed first is in a visible state with the first mask data 21 superposed thereon between time 0 and time x. The image data 1A is gradually obscured, but still in a visible state between time x and time w. Accordingly, it is determined here that mask color is not changed.

Since the transmittance of the second mask data 22 is maintained at the minimum value between time 0 and time y, only the image data IA is in a visible state.

Between time y and time x, the transmittance of the second mask data 22 is gradually increased in the step S112. Accordingly, the image data 1B gradually becomes visible between time y and time x. That is, from time y to time x, both image data 1A and 1B are in visible state.

At the time x, the mask data 20 is moved in the step S113. The positions of the first mask data 21 and second mask data 22 are then switched with each other. Thereafter, the operation returns to the step S108, where the image switching is continued. Subsequently, in the step S109, the switching from the image data 1A displayed first to the image data 1B is made between time x and time z. Therefore, it is determined here that the colors of the second mask data 22 need to be adjusted. Then the operation proceeds to the step S110.

In the step S110, the image color recognizer 135F acquires the image color information 111 corresponding to ID information 112 of the image data 1B. Based on the color information recognized in the step S110, the mask color adjustor 135G adjusts the colors of the second mask data 22 in the step S111.

Thereafter, the transmittance of the second mask data 22 is gradually decreased by the operation of the step S112 between time x and time w. The transmittance of the second mask data 22 is maintained at the minimum value between time w and time z. Accordingly, only the image data 1B is in a visible state.

The operation state of the steps from S108 to S113 is displayed on the display section, so that it is possible to actually confirm the switching state from one image data to the next.

[Effects of Image-processing Device According to First Embodiment]

In the first embodiment as described above, the following effects can be obtained:

(1) The image-processing device 130 according to the first embodiment includes the data access section 131 that reads the composite image data 10 in which a plurality of image data are combined into a single data structure, and the controller 136 that selectively displays, on the display section 140, only a desired image data of the image data included in the composite image data 10. By combining a plurality of image data into a single composite image data 10 as described above, the volume of the image data can be significantly reduced. Therefore, in such a device as having limited capacity for saving image data or the like, such as a car navigation, mobile phone, or other devices having a small-sized movie display section, a number of images can be displayed by using the composite image data in which a plurality of image data are combined. Further, the save area used for preservation of image data in the conventional configuration can be assured as a free space, and thus, can be effectively utilized. Further, the more the number of image data, the more time it has taken to retrieve one image data from a plurality of image data in the conventional configuration. On the other hand, the image-processing device according to the first embodiment, in which the image data can be easily organized by incorporating a plurality of image data into composite image data, can quickly perform the search without taking a lot of time, thereby realizing smooth and favorable display switching operation.

(2) The composite image data 10 is constituted by at least one combination of the constitutional image data 101 that constitute image data different from each other. The controller 136 includes the mask data 20 and mask controller 135 that controls the mask data 20. The mask data 20 allows the display section 140 to display the composite image data 10 in such a manner that the first mask data 21 is superposed on the constitutional image data 101 of the composite image data 10 by unit of image data, and allows only the constitutional image data 101 that are superposed by the first mask data 21 to be made visible. Thus, only the desired constitutional image data can be easily acquired from the composite image data 10 and displayed on the display section 140.

(3) The mask controller 135 moves the mask data 20 as needed, to switch the superposition state by unit of image data. Thus, it is possible to switch the image data to be displayed by simply moving the mask data 20 with respect to the composite image data 10. This eliminates the need for a complicated program or configuration to switch the images, leading to an improvement in productivity.

(4) The composite image data 10 has a data structure in which the constitutional image data 101 are alternately arranged in a substantially striped manner. The mask data 20 has a plurality of data pieces, each having a stripe shape, to be superposed on the respective constitutional image data 101 that constitute the composite image data 10. The mask controller 135 moves the mask data 20 substantially along the arrangement direction of the constitutional image data 101. Thus, it is possible to switch the image data by just moving the mask data 20 forwards or backwards in a single direction. Therefore, the switching operation of the image to be displayed can be completed more easily.

(5) The mask controller 135 can adjust the color of the mask data 20 to the color substantially the same as the general color of the constitutional image data to be superposed by the first mask data 21. Thus, the colors of the image data to be displayed and second mask data 22 to be superposed on another image data can be matched with each other, with the result that color harmony of the entire image can be achieved, thereby obtaining a good appearance.

(6) The image-processing device includes the image compositing section 120 that acquires a plurality of image data and combines the acquired image data to generate the composite image data 10 having a single data structure. Thus, even when a plurality of image data are used, it is possible to quickly combine the image data into the composite image data 10, which eliminates the need for other equipments to create the composite image data, and makes it possible to easily generate the composite image data.

(7) The image compositing section 120 generates the composite image data 10 such that the size of the composite image data 10 substantially corresponds to the size at which the image data is displayed on the display section in (6). In other words, a plurality of image data can be organized into the composite image data having a size corresponding to one image data. Therefore, by using the composite image data 10 that includes a plurality of image data with a data size corresponding to one image data, a storage area for storing the composite image data 10 can be reduced, assuring a large amount of free space to be effectively utilized.

(8) The mask data 20 gradually changes its transmittance to switch the image data to be displayed. The way that one image data is switched to another image data can thus be displayed. Therefore, the user can also enjoy the transition from one image data to another.

(9) The image color recognizer 135F recognizes the image color information 111 corresponding to the constitutional image data 101 that constitute respective image data. Based on the recognized color information, the mask color adjustor 135G adjusts the colors of the second mask data 22. Thus, the colors of the second mask data 22 can be adjusted to the colors of the respective constitutional image data 101 that constitute the respective image data. Therefore, the image data to be viewed through the second mask data 22 is not disturbed, so that a much clearer image can be displayed.

(10) The composite image data 10, image position information table 11, mask position information table 12 and the like that have been read from the storage section 110 are temporarily stored in the preservation section 132. This configuration makes it possible to quickly acquire the information, when needed, and to reduce the time needed for reading the information.

Second Embodiment

Figure 7:
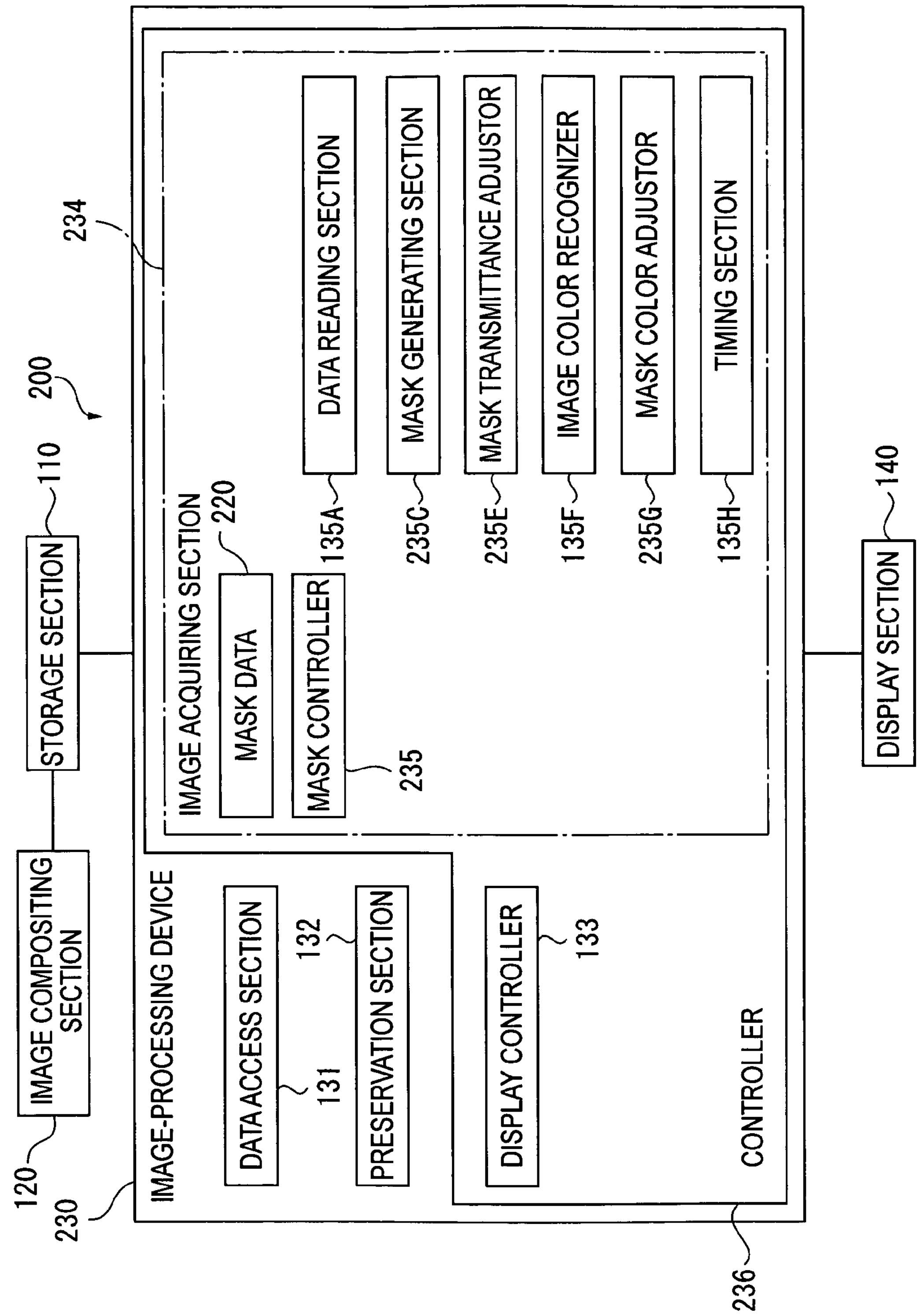
FIG.7 is a block diagram schematically showing a configuration of an image acquiring section of the image-processing device according to a second embodiment.
Figure 8:
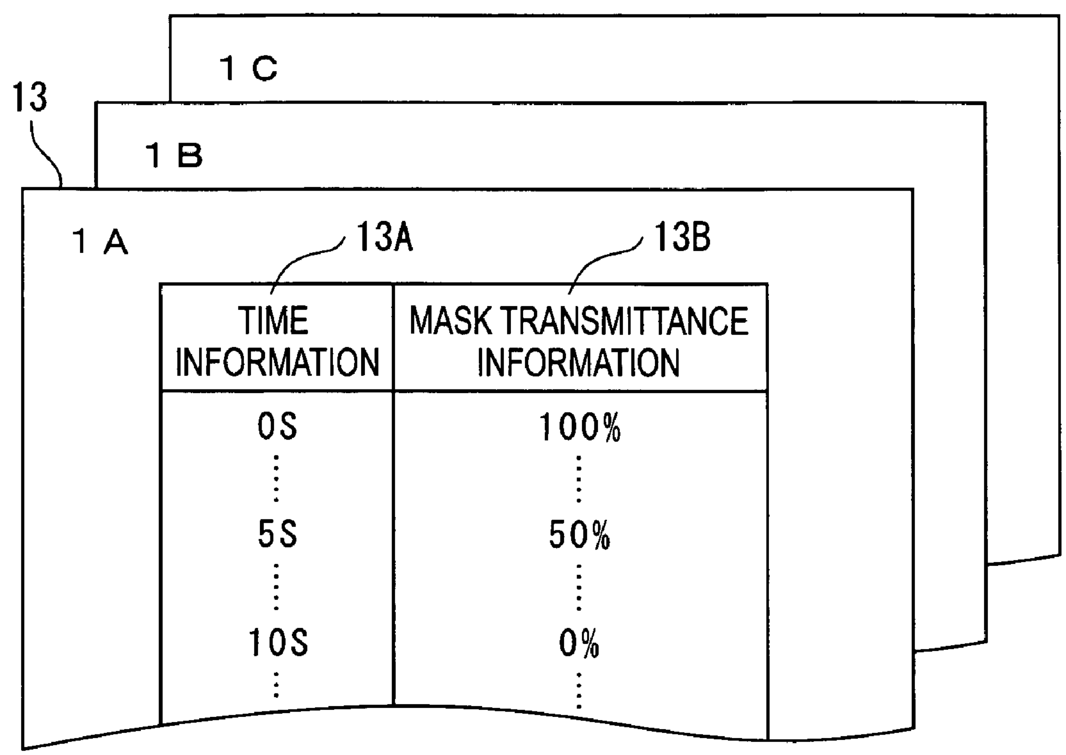
FIG. 8 is a table describing data used in the image-processing device according to the second embodiment.
Figure 9:
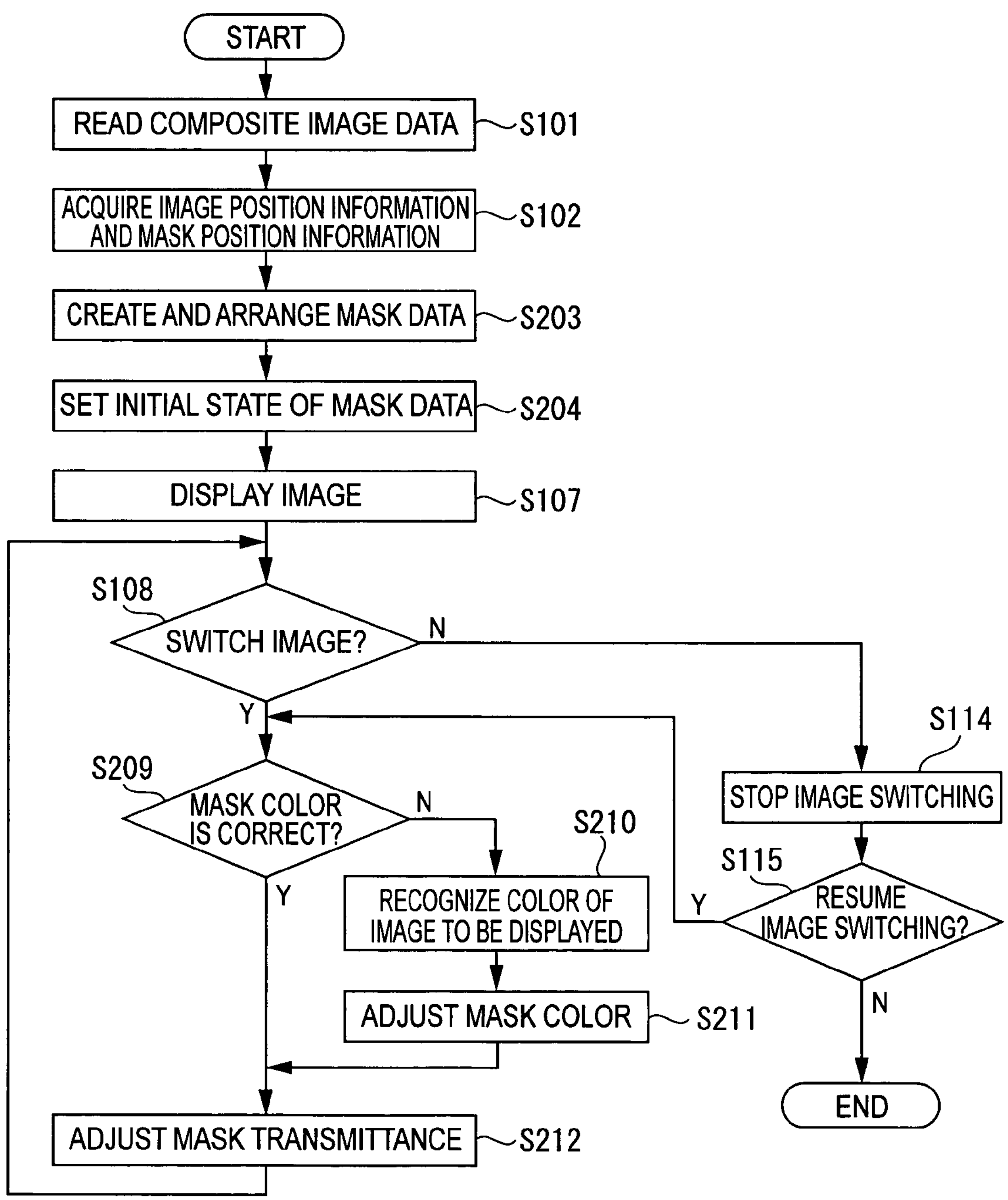
FIG. 9 is a flowchart showing operations of the image-processing device according to the second embodiment.

Next, a description will be given for an image-processing device according to a second embodiment. In the image-processing device according to the second embodiment, the mask data need not be moved in order to switch the image. A configuration that switches background images displayed on a display unit of, for example, a car navigation or mobile phone will be described as an image-processing device according to the second embodiment. As is the case with the first embodiment, the background image switching function of the image-processing device according to the present invention is applicable not only to small-sized devices such as a car navigation or mobile phone, but also to devices having a monitor as used in a personal computer or other types of image display devices. FIG. 7 is a block diagram schematically showing a configuration of the image-processing device according to the second embodiment. FIG. 8 schematically shows a mask position information table used in the second embodiment. FIG. 9 is a flowchart of operations of the image-processing device according to the second embodiment. In this embodiment, the same reference numerals as the first embodiment are given to the components which are identical with or similar to the first embodiment, and the overlapped description is omitted or simplified.

[Configuration of Image Display Device]

In FIG. 7, the image display device 200 of the second embodiment includes a storage section 110, an image compositing section 120, an image-processing device 230 that acquires predetermined image data from the composite image data 10, and a display section 140 that displays the image data.

The image-processing device 230 includes a data access section 131, a preservation section 132, a controller 236 having an image acquiring section 234 that acquires the image data and a display controller 133. The image acquiring section 234 includes mask data 220 to be superposed on the composite image data 10, and a mask controller 235 that controls the mask data 220.

[Data Structure of Composite Image Data]

The composite image data 10 used in the second embodiment is the same as the composite image data 10 used in the first embodiment. Further, the image position information table 11 is formed in a similar fashion as in the case of the first embodiment. Therefore, the descriptions of the data structure of the composite image data 10 and image position information table 11 are omitted.

[Data Structure of Mask Data]

The mask data 220 used in the second embodiment will next be described. The mask data 220 includes stripe-shaped mask cell data 23, which are so arranged as to correspond to the substantially stripe-shaped constitutional image data 101 that constitute the composite image data 10. The mask cell data 23 recognize the shape and position of the constitutional image data 101 based on the image position information 113 of each image data described in the image position information table 11 corresponding, and thereby the data 23 have substantially the same size as the constitutional image data 101. One mask cell data 23 of the mask data 20 is superposed on each of the constitutional image data 101 that constitute respective image data. The transmittance of the mask cell data 23 can be controlled by the mask controller 235. High transmittance allows the image data in the composite image data 10 to be visible, whereas low transmittance obscures the image data of the composite image data 10.

The transmittance of the mask cell data 23 of the mask data 220 at a predetermined time is described in the mask position information table 13 as shown in FIG. 8. The mask position information table 13 is prepared, for example, for each image data and describes time information 13A and mask transmittance information 13B indicating the transmittance of the mask cell data 23 at the time indicated by the time information 13A.

A set of the above mask position information tables 13 is created for each composite image data 10. Thus, when a plurality of composite image data 10 are used, a plurality of sets of mask position information tables 13 are prepared in correspondence with the respective composite image data 10. Alternatively, one basic mask position information table may be created previously, and another or other mask position information tables may automatically be created based on the basic mask position information table. For example, one mask position information table 13 describing the time information 13A and mask transmittance information 13B is prepared as the basic information. When the reading operation of the composite image data 10 has been completed, the mask position information tables 13 that correspond to image data included in the composite image data 10 are created. At this time, the time information 13A is slightly shifted with respect to the respective image data. Thus, the transmittance of the mask cell data 23 that constitute different image data do not change all at once. Therefore, it is possible to create the mask position information table 13 that allows the mask cell data 23 to sequentially change for each image data.

[Configuration of Image-processing Device]

A detailed configuration of the image-processing device 230 will next be described with reference to FIG. 7. The image-processing device 230 includes, as described above, the data access section 131, preservation section 132, display controller 133 and controller 236.

The data access section 131 reads the composite image data 10 and information such as the image position information table 11 from the storage section 110.

The preservation section 132 temporarily stores information that has been read by the data access section 131 such that the stored data can promptly be taken from the preservation section 132.

The display controller 133 displays the image data that has been acquired by the image acquiring section 234 on the display section 140.

[Configuration of Image Acquiring Section]

A more detailed description will be given of the configuration of the image acquiring section 234 according to the second embodiment.

As shown in FIG. 7, the image acquiring section 234 includes mask data 220 and mask controller 235.

The mask controller 235 controls the mask data 220 to allow the desired image in the composite image data 10 to be seen therethrough, and to obscure another or other images. The mask controller 235 includes a data reading section 135A, a mask generating section 235C, a mask transmittance adjustor 235E, a mask color adjustor 235G, and a timing section 135H.

The mask generating section 235C generates the mask data 220 based on the image position information table 11 that has been read by the data reading section 135A. To do this, at first, the position and size of the constitutional image data 101 that constitute the composite image data 10 is recognized from the image ID information 112 and image position information 113 described in the image position information table 11. The mask cell data 23 having a size substantially the same as the constitutional image data are then created and superposed on the constitutional image data 101.

The mask transmittance adjustor 235E can adjust the transmittance of the mask cell data 23. When the mask transmittance adjustor 23SE lowers the transmittance of the mask cell data 23, the image data that has been superposed by the mask cell data 23 becomes invisible. By contraries, when the transmittance of the mask cell data 23 is increased, the image data that has been superposed by the same mask cell data 23 becomes visible. As described above, by changing the transmittance of the mask cell data 23, the image data to be displayed can be switched between them. Further, the mask transmittance adjustor 235E can adjust the speed at which the transmittance is changed. A successive change in the transmittance can express fade-in or fade-out transition of the image data. Accordingly, a prompt change in the transmittance allows the image to suddenly appear or disappear.

For example, it is assumed that the general color of the image data that is being displayed and that of the mask cell data that surround the same image data are different from each other. In this case, the general color of the image data and that of the mask data interfere with each other, which can results in bad appearance. In order to cope with this problem, the image color recognizer 135F and mask color adjustor 235G are configured to be capable of adjusting the general color of the mask cell data 23 to the color substantially the same as that of the image data that is being displayed.

The image color recognizer 135F serves for checking the color of each cell of the respective image data. To do this, respective image color information 111 corresponding to the image ID information 112 of the respective image data described in the image position information table 11 are referred to. The image color recognizer 135F then determines the color of each of the mask cell data 23 based on the image color information 111.

The mask color adjustor 235G adjusts the color of the mask cell data 23 to the color that has determined by the image color recognizer 135F. The mask color adjustor 235G can change the color for each of the constitutional image data 101 that constitute the image data. The mask color adjustor 135G used in the first embodiment can change only the colors of the second mask data 22, whereas the mask color adjustor 235G according to the second embodiment can change the colors of all of the mask cell data 23 of the mask data 220.

[Operations of Image-processing Device in Second Embodiment]

Next, operations of the above image-processing device 230 according to the second embodiment will next be described.

As is the case with the first embodiment, in the image-processing device 230 according to the second embodiment, the composite image data 10, image position information table 11, and mask position information table 13 are read and stored temporarily in the preservation section 132 by the operations from steps S101 to S102. Then the necessary composite image data 10, image position information table 11, and mask position information table 13 are read from the data stored in the preservation section 132.

Subsequently, the mask generating section 235C generates the mask data 220 based on the image ID information 112 and image position information 113 described in the image position information table 11 that has been acquired in the step S102. The mask generating section 235C then superposes the mask data 220 on the composite image data 10 (step S203).

Thereafter, an initial state of the mask data 220 is determined based on the mask transmittance information 13B in the start time indicated by the time information 13A of the mask position information table 13 (step S204). For example, it is assumed that the mask position information table 13 describes that the transmittance of the image data 1A is 100% at the start time indicated by the time information 13A, and that the transmittance of the image data 1B at the start time is 10%. In this case, the transmittance of the mask cell data 23 to be superposed on the image data 1A is set at 100%, and the transmittance of the mask cell data 23 to be superposed on the image data 1B is set at 10%.

On the determination of the initial state in the step S204, the mask color adjustor 235G adjusts the colors of the mask cell data 23. More specifically, the image color recognizer 135F acquires the image color information 111 corresponding to image ID information 112 of respective image data from the image position information table 11. The colors of the mask cell data 23 are then determined based on the image color information 111. Thereafter, the mask color adjustor 235G adjusts the color of the mask cell data 23 to correspond to the respective constitutional image data 101 of the image data.

The composite image data 10 that has been set to the initial state as describe above is displayed on the display section in the step S107. At the same time, a timer of the timing section 135H starts to operate. When the timer has reached a predetermined time specified by the time information 13A of the mask position information table 13, it is determined whether image switching operation is executed or not in the step S108. Note that the time information 13A may represent the aforementioned time unit, that is, time unit corresponding to a clock signal or the like, in addition to the time unit such as hour, minute, second or the like, as in the case of the first embodiment.

When it has been determined to execute switching operation in step S108, the image color recognizer 135F confirms whether the colors of the mask cell data 23 and image color information 111 of the image position information table 11 correspond to each other (step S209). More specifically, in the step S209, the image color recognizer 135F first recognizes the colors of the current image data and the next image data from the image color information 111 and mask transmittance information 13B. When the current image data and the next image data are different from each other, the color of the mask cell data 23 is adjusted. On the other hand, in the case where the two image data resemble in color even when the two image data are different from each other, or where the two image data are the same, color adjustment of the mask cell data 23 may be omitted.

In the step S209, when it is determined that the color adjustment needs to be performed, the image color recognizer 135F determines the colors of the mask cell data. At this time, the image color recognizer 135F refers to image color information 111 of the next image data (step S210).

The color information of the mask cell data 23 determined in the step S210 is sent to the mask color adjustor 235G. Based on the color information, the mask color adjustor 235G adjusts the colors of mask data 23 corresponding to the constitutional image data 101 (step S211).

After the colors of the mask cell data 23 are adjusted in the operation from the steps S209 to S211, the mask transmittance adjustor 235E adjusts the transmittance of the mask cell data (step S212). More specifically, in the step S212, the mask transmittance information 13B of the mask position information table 13 is used for reference to adjust the transmittance of mask cell data 23.

As describe above, the mask transmittance adjuster 235E can successively change the transmittance in the step S212.

This allows, for example, fade-in or fade-out expression of the image data. The transmittance of the mask cell data 23 is decreased/increased to obscure the current image data or to allow the next image data to be visible, thereby realizing display switching.

After the transmittance of the mask data 220 is adjusted, in the step S212, the operation returns to the step S108, where it is determined whether image switching operation is continued or not.

When it is determined, in the step S108, that image switching operation is not executed, stop processing for image switching operation is executed in the step S114. In this state, the image switching operation can be resumed any time by the operation of the step S115, otherwise, it is possible to terminate the image display.

The operations from the steps S108 to S212 are automatically switched between them at a predetermined time under the control of the timing section 135H.

Image switching operation from the image data 1A to image data 1B will be described as an example of image switching operation from the step S108 and steps S209 to S212. It is assumed that only the image data 1A is displayed on the display section 140. The image acquiring section 134A executes image switching operation based on the time information 13A and image data information 12B of the mask position information table 13. Several assumptions are further made as follows: • The transmittance of the mask cell data 23 to be superposed on the image data 1A is maintained at the maximum value from time 0to time x, and the transmittance of the mask cell data 23 to be superposed on the image data 1B is maintained at the minimum value from time 0 to time y, according to the time information 12A. • The transmittance of the mask cell data 23 to be superposed on the image data 1B is gradually increased up to maximum value between time y and time x (0<y<x). • After that, the transmittance of the mask cell data 23 to be superposed on the image data 1B is maintained at the maximum value from time x to time z, whereas the transmittance of the mask cell data 23 to be superposed on the image data 1A is gradually decreased from the maximum to the minimum value from time x to time w, and maintained at the minimum value from time w to time z (x<w<z).

In the case described above, it is determined at first that the colors of the mask cell data 23 are changed or not, in the step S209. The image data 1A that is displayed first is in a visible state due to the maximum value of the transmittance between time 0 and time x. Between time x and time w, the transmittance of the mask cell data 23 superposed on the image data 1A is gradually decreased, but the image data 1A is still in a visible state. Accordingly, it is determined here that mask color is not changed. Between time 0 and time y, only the image data 1A is in a visible state.

Between time y and time x, the image data 1B gradually becomes visible by the step S212. That is, from time y to time x, both image data 1A and 1B are in visible state. The operation returns to the step S108, where the image switching operation is continued. Subsequently, in the step S209, the switching from the image data 1A displayed first to the image data 1B is made between time x and time z. Therefore, it is determined here that the colors of the mask cell data 23 need to be adjusted. Then the operation proceeds to step S210.

In the step S210, the image color recognizer 135F acquires the image color information 111 corresponding to ID information 112 of the image data 1B. Based on the color information recognized in the step S110, the mask color adjustor 235G adjusts the colors of the mask cell data 23 in the step S211.

Thereafter, the transmittance of the mask cell data 23 is adjusted in the step S212 between time x and time w to allow the image data 1A to gradually become invisible. Finally, between time w and time z, only the image data 1B is in a visible state.

[Effects of Image-Processing Device According to Second Embodiment]

According to the image-processing device 230 used in the second embodiment, the following effects can be obtained in addition to the effects (1), (2) and (5) to (10) of the first embodiment:

(11) The mask controller 235 controls the mask data 220 to switch, for each image data, the degree at which the constitutional image data 101 of the composite image data 10 are viewed through the mask cell data pieces 23. This eliminates the need to move the mask data 220 in image switching operation, and simplifies the function of the mask controller 235. Even when the composite image data 10 includes much more image data, image switching operation can be easily executed by just adjusting the transmittance of the mask data 220.

(12) The mask controller 235 successively changes the transmittance of the mask data 220. This allows fade-in or fade-out expression of the image data. Therefore, various image display methods and image switching methods can be realized, and the user can enjoy these expressions.

(13) It is only necessary that the information recorded on the mask position information table 13 includes only the time information 13A and mask transmittance information 13B. Thus, data size of the mask position information table can be reduced, and switching of the image data can be realized by a simple operation. Further, in the editing of the mask position information table 13, it is only necessary that the transmittance of the mask cell data 23 with respect to time be recorded. Therefore, it is possible to easily edit the mask position information table.

Third Embodiment

Figure 10:
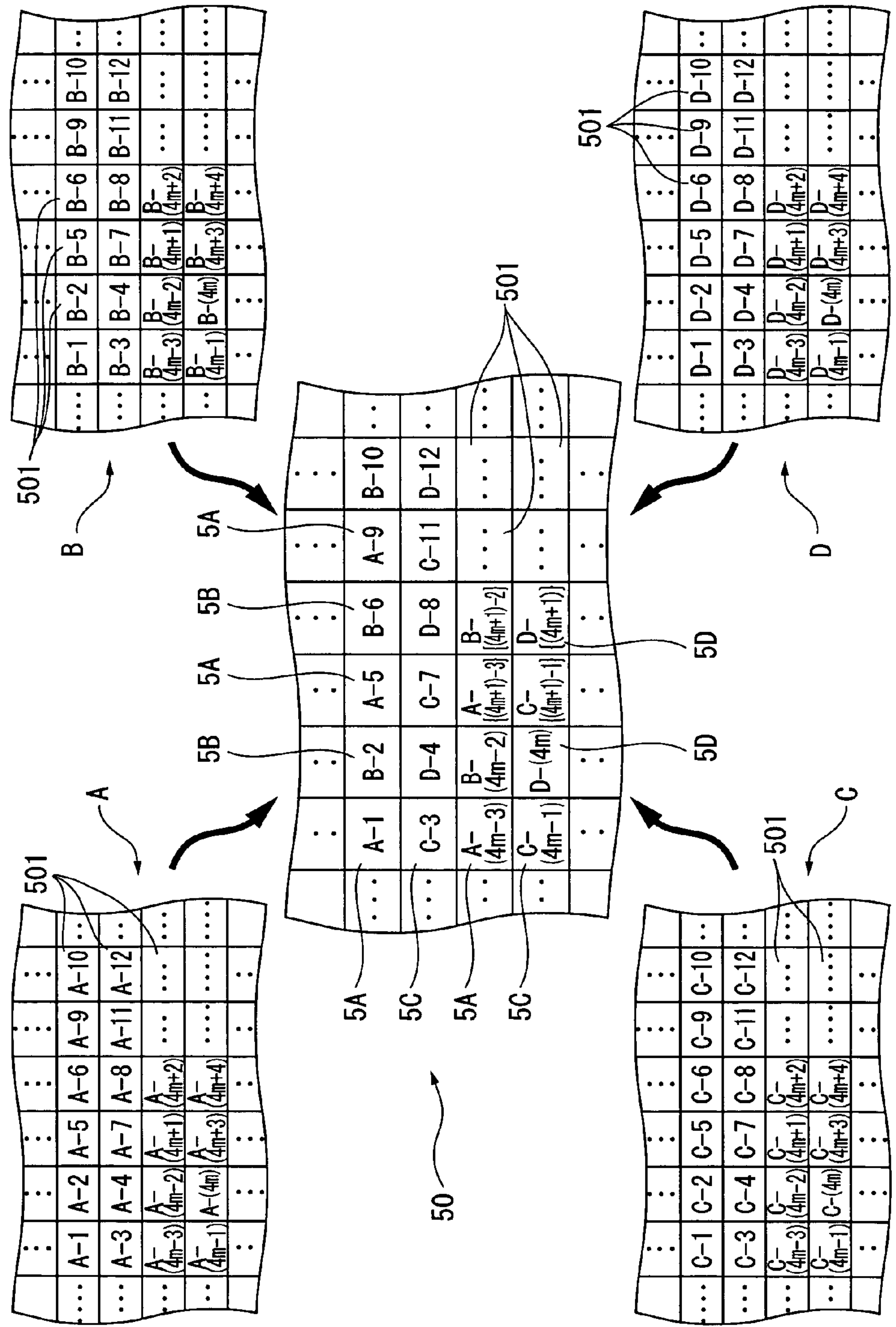
FIG. 10 shows a part of composite image data according to a third embodiment.
Figure 11:
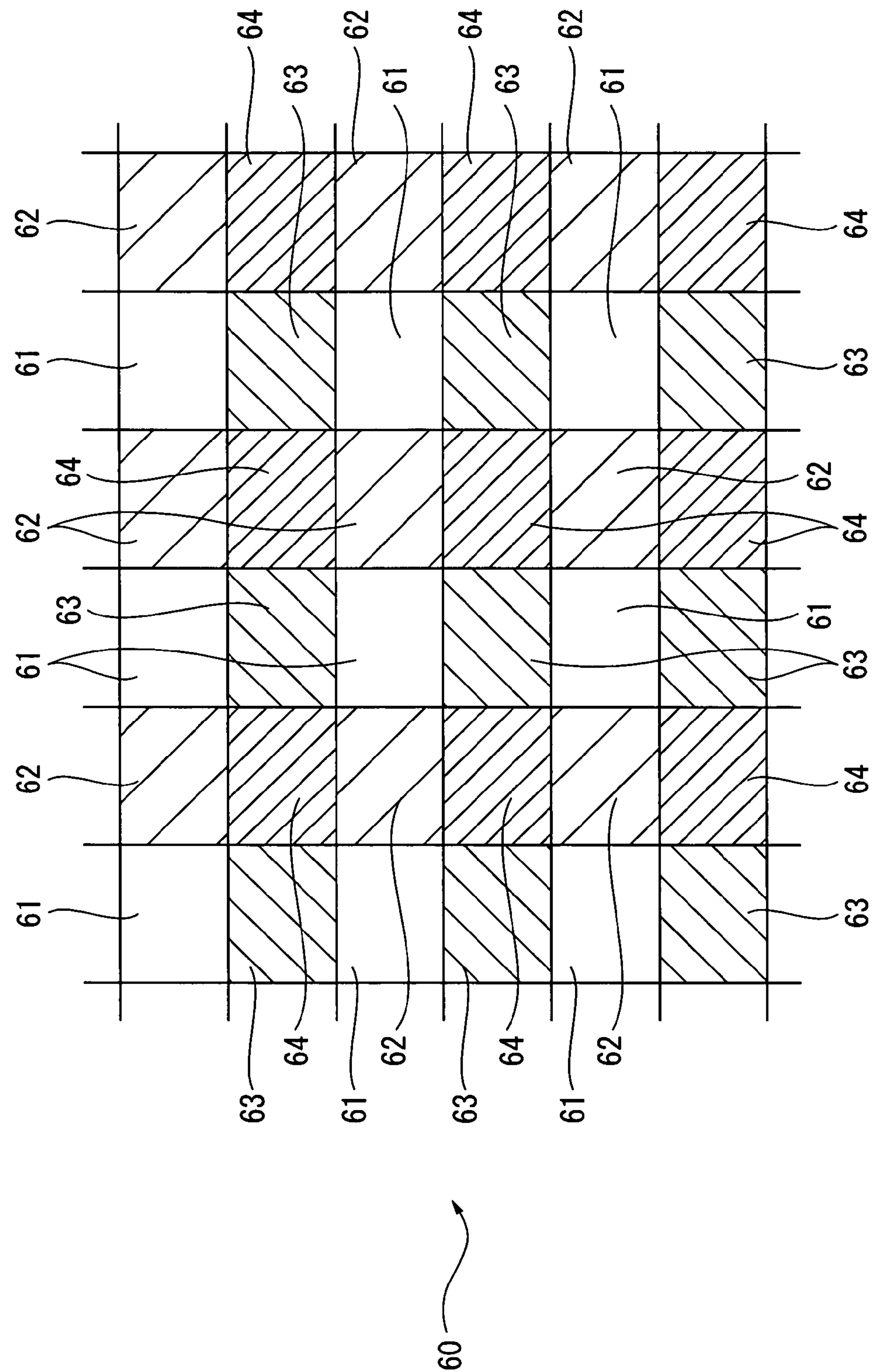
FIG. 11 shows a part of the image filter section according to the third embodiment.

In the first and send embodiments, the composite image data 10 is constituted by breaking the image data 1A and 1B. into stripes and arranging the stripe-shaped data. In the third embodiment, image data are arranged in a matrix to form the composite image data. FIG. 10 shows a part of a composite image data 50 used in the image-processing device according to the third embodiment. FIG. 11 shows a part of mask data. In this embodiment, the same reference numerals are given to the components which are identical with or similar to the first and second embodiments, and the overlapped description is omitted.

[Image Display Device According to Third Embodiment]

As is the case with the above first and second embodiments, the image display device according to the third embodiment can be applied to an image display device that switches background images displayed on a display unit of, for example, a car navigation or mobile phone. The image switching function of the image-processing device according to the present invention is applicable not only to small-sized devices such as a car navigation or mobile phone, but also to devices having a monitor as used in a personal computer or other types of image display devices. The image display device used in the third embodiment has substantially the same configuration as the image display device used in the first and second embodiments. Thus, the same reference numerals as the first and second embodiments are given to the same components, and the descriptions thereof are omitted. The composite image data 50 and mask data 60 have the following data structures.

[Data Structure of Composite Image Data]

In the state shown in FIG. 10 where four image data A, B, C and D are being displayed as images, the composite image data 50 includes constitutional image data 501 arranged in a lattice form. Numbers are then assigned to each of the constitutional image data 501 that constitute respective images. In this case, for example, (4*n*-3) is located in the upper-left corner, (4*n*-2) is in the upper-right corner, (4*n*-1) is in the lower-left corner, and (4*n*) is in the lower-right corner, where n is an integer not less than 1. On the right side of (4*n*-2), (4*n*-3) obtained by adding 1 to n is located. Numbers are assigned such that n becomes m-1 at the right edge of the image data, (4*m*-3) is located on the lower side of (4*n*-1)(m>*n*). In image data A, for example, A-2 is located on the right side of A-1, A-3 is on the lower side of A-1, A-4 is on the lower side of A-2 and on the right side of A-3, and A-5 is right side of A-2.

Then, the constitutional image data 101 having numbers represented by (4*n*-3), the constitutional image data 101 having numbers represented by (4*n*-2), the constitutional image data 101 having numbers represented by (4*n*-1), and the constitutional image data 101 having numbers represented by (4*n*) are picked up from the image data A, B, C and D, respectively. The picked up constitutional image data are then sequentially arranged in an alternate manner to form composite image data 50. Also in the composite image data 50, assuming that n is an integer not less than 1, (4*n*-3) is located in the upper-left corner, (4*n*-2) is in the upper-right corner, (4*n*-1) is in the lower-left corner, (4*n*) is in the lower-right corner, and (4*n*-3) obtained by adding 1 to n is located on the right side of (4*n*-2), and assuming that n becomes m-1 at the right edge of the image data, (4*m*-3) is located on the lower side of (4*n*-1)(m>*n*). Respective cells of the image data A to D are arranged in correspondence with the assigned numbers of the composite image data 50. Here, the composite image data 50 is constituted by image data 5A including constitutional image data 501 (A-1, A-5, A-9, . . . ) that have been picked up from the image data A, image data 5B including constitutional image data 501 (B-2, B-6, B-10, . . . ) that have been picked up from the image data B, image data 5C including constitutional image data 501 (C-3, C-7, C-11 . . . ) that have been picked up from the image data C, and image data 5D including constitutional image data 501 (D-4, D-8, D-12 . . . ) that have been picked up from the image data D.

Image information of the above composite image data 50 includes the same contents as the image position information table 11. That is, as in the case of the composite image data 10, one image position information table 11 of the composite image data 50 may be created for one image data, and includes, for example, image ID information 112, image position information 113, and image color information 111 of the image data, which are related to each other.

[Data Structure of Mask Data]

Next, a description will be given of the mask data 60 that is superposed on the composite image data 50. As shown in FIG. 11, mask cell data 61 to 64 are so arranged in a lattice form as to correspond to respective constitutional image data 501 of the composite image data 50, thereby forming one mask data 60. In this case, mask cell data 61 are superposed on the position at which the image data 5A is disposed, mask cell data 62 are superposed on the position of the image data 5B, mask cell data 63 are superposed on the position of the image data SC, and mask cell data 64 are superposed on the position of the image data 5D. The mask data 60 may be formed based on the image position information 113 that is obtained by reading the image position information table 11. Alternatively, the mask data 60 that has previously been divided into a lattice pattern may be prepared.

[Configuration of Image-Processing Device]

The image-processing device using the above composite image data 50 may switch the image data by moving the mask data 60 as in the case of the first embodiment, or only by changing the transmittance of the mask data 60 as in the case of the second embodiment.

The image-processing device according to the third embodiment includes a data access section 131 that reads data, a preservation section 132 that temporarily stores the data, an image acquiring section 134 that selects the image data from the composite image data 10, and a display controller 133 that displays the desired image data on a display section.

The image acquiring section 134 includes the mask data 60, a mask controller 135 that controls the mask data 60, and a display controller 133 that outputs the image processed by the image acquiring section to a display section 140.

In the third embodiment, the mask controller 135 may include, as shown in FIG. 1, a data reading section 135A, mask position confirming section 135B, mask generating section 135C, mask movement section 135D, mask transmittance adjustor 135E that changes the transmittance of the mask cell data 61 to 64 that constitute the mask data 60, image color recognizer 135F, mask color adjustor 135G that adjusts the colors of the mask cell data 61 to 64, and timing section 135H. Alternatively, as shown in FIG. 7, the mask movement section 135D and mask position confirming section 135B may be omitted.

[Operations of Image-Processing Device According to Third Embodiment]

When the case in which the images are switched by moving the mask data 60 is employed, operations of the image-processing device according to the third embodiment are substantially the same as those described in the first embodiment. On the other hand, when the case in which the images are switched only by changing the transmittance of the mask cell data 61 to 64 is employed, operations of the image-processing device according to the third embodiment are substantially the same as those described in the second embodiment.

The mask data 20 is moved crosswise to the stripe direction of the composite image data 10 by the mask movement section 135D in the first embodiment. In the third embodiment, since the composite image data 50 has a lattice form, the mask data 20 can move both in vertical and horizontal directions.

When the case in which the mask transmittance adjustor 135E switches the image data only by changing the transmittance is employed, as in the case of the second embodiment, the mask transmittance adjustor 135E adjusts the transmittance of the mask cell data 61 to 64 after the image data to be displayed is recognized based on the image position information table 11 and mask position information table 12.

[Effects of Image-Processing Device According to Third Embodiment]

According to the image-processing device used in the third embodiment, the following effects can be obtained in addition to the aforementioned effects (1) to (3) and (5) to (12):

(14) The composite image data 50 is formed by breaking a plurality of image data into lattice-shaped constitutional image data and by alternately arranging the constitutional image data. Thus, an image data can be divided into smaller pieces, narrowing space between image data. For example, in the case where the composite image data 50 includes many image data, when the image data are arranged in a striped manner, the space between the same image data may be widened. More specifically, for example, many other image data are arranged between one image data 1A and the next image data 1A, widening the space between the image data 1A. On the other hand, when the image data are divided into a lattice pattern, the constitutional image data can be arranged not only in a vertical direction, but also in a horizontal direction. Thus, in the above example, the spaces between one image data 1A and the next image data 1A are equalized to prevent the space from extremely being widened. As a result, more detailed image can be displayed.

Further, the image color recognizer 135F can recognize the colors of the respective lattice-shaped cells that constitute the composite image data. After that, the mask color adjustor can adjust the color of each lattice-shaped cell. Thus, the color of the stripe can be adjusted more finely. This prevents the deterioration of the display image when the mask data 60 is superposed on the composite image data. In particular, deterioration of the color tone can be prevented.

Forth Embodiment

Figure 13:
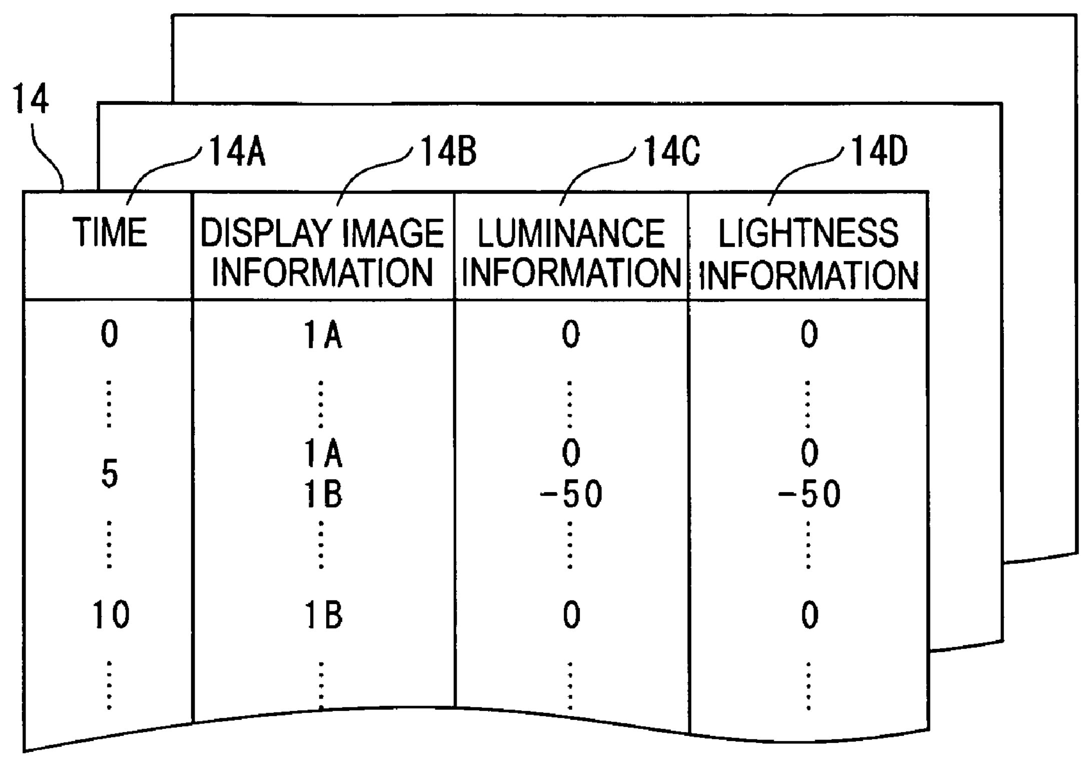
FIG. 13 is a table describing one of the data used in the image-processing device according to the fourth embodiment.
Figure 14:
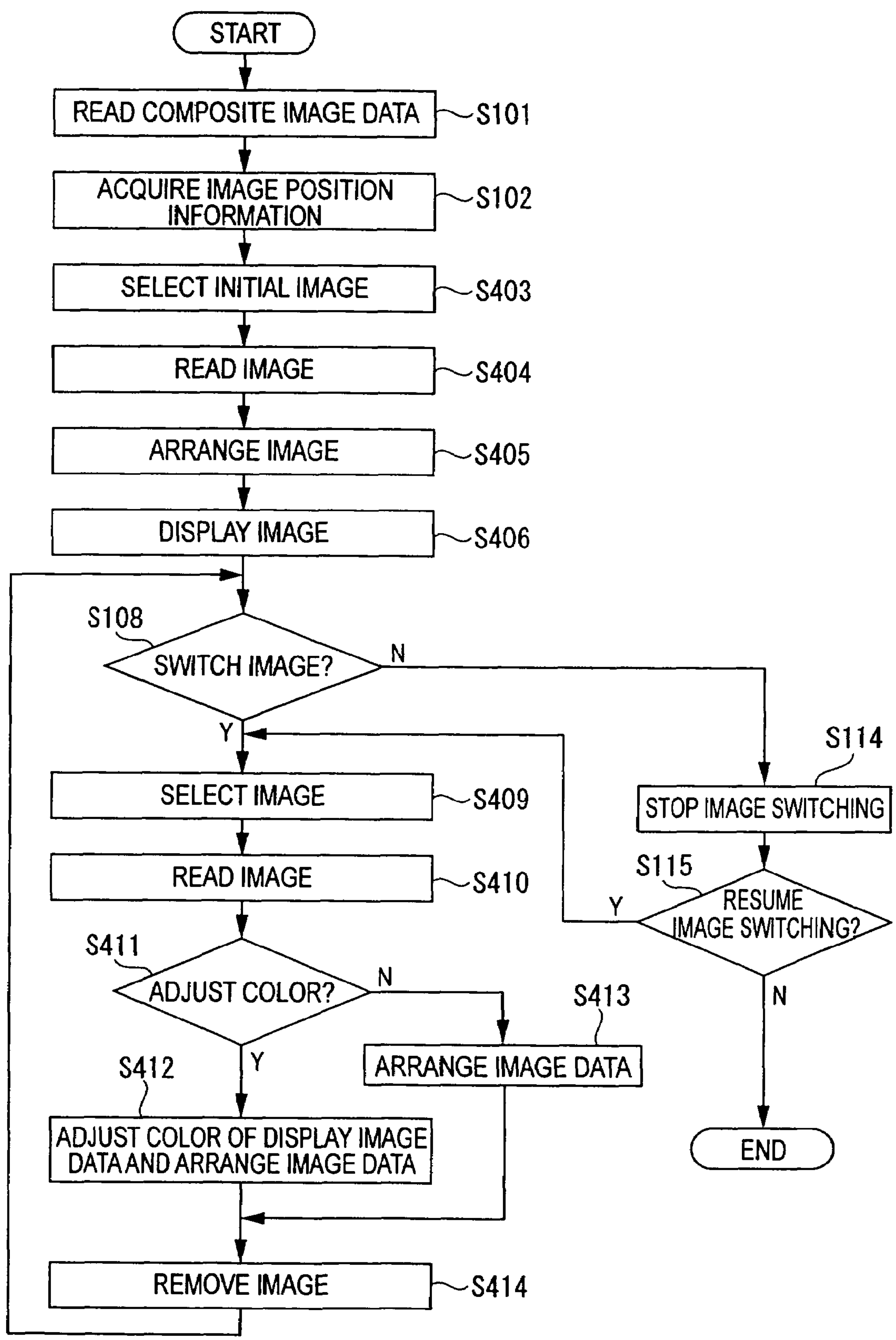
FIG. 14 a flowchart showing operations of the image-processing device according to the fourth embodiment.

A description will be given of an image-processing device according to a fourth embodiment with reference to FIGS. 12 to 14. As is the case with the above first to third embodiments, the image display device according to the fourth embodiment can be applied to an image display device that switches background images displayed on a display unit of, for example, a car navigation or mobile phone. The image-processing device according to the present invention is applicable not only to small-sized devices such as a car navigation or mobile phone, but also to devices having a monitor as used in a personal computer or other types of image display devices. FIG. 12 is a block diagram schematically showing a configuration of the image-processing device according to the fourth embodiment. FIG. 13 shows a display image information table describing information of the image data to be displayed. FIG. 14 is a flowchart of the operations of the image-processing device. The same reference numerals are given to the components which are identical with or similar to the first to third embodiments, and the overlapped description is omitted.

[Configuration of Image Display Device According to Fourth Embodiment]

As shown in FIG. 12, an image display device 400 according to the fourth embodiment includes a storage section 110, display section 140, image-processing device 430, and image compositing section 120.

For example, the composite image data 10 shown in FIG. 2 or the composite image data 50 shown in FIG. 10 can be used as composite image data in the fourth embodiment. The information of the composite image data 10 or 50 is described in the image position information table as shown in FIG. 4. The mask data is not used in the fourth embodiment. In other words, the image-processing device 430 of the image display device 400 selectively reads only predetermined image data from the composite image data so as to display the selected image data.

[Configuration of Image-processing Device]

The image-processing device 430 includes a data access section 131, a preservation section 132, an image acquiring section 434 that selects and acquires the desired image data from the composite image data 10, and a display controller 133.

The image acquiring section 434 includes a data reading section 135A, an image selecting section 434B that selects the desired image data from the composite image data, an image reading section 434C that reads the selected image data, an image rearrangement section 434D that arranges the read image, display image data 434A on which the image is arranged, an image removing section 434E that removes the image data from the display image data 434A.

The image selecting section 434B selects the constitutional image data 101 that constitute the same image data on the composite image data 10 or 50 based on the image ID information 112 described in the image position information table 11, and serving as identification information. The image ID information is, as described above, information indicating to which image data respective constitutional image data belong. How the constitutional image data 101 are arranged on the image data can be recognized based on the image position information 113. The image selecting section 434B selects the desired image data based on the above information. At this time, image data is selected based on a display image information table 14. As shown in FIG. 13, the display image information table 14 describes, for example, time information 14A, display image information 14B, luminance information 14C of the display image, lightness information 14D of the display image. The display image information table 14 is editable by a user, therefore the user can control the display order, display speed, or switching speed of the image.

The image reading section 434C reads, from the composite image data 10 or 50, only the image data selected by the image selecting section 434B. The read image data may be stored in the preservation section 132 from which the stored data can promptly be taken.

The image rearrangement section 434D rearranges the image data read by the image reading section 434C on the display image data 434A. The display image data 434A exists as plain image data whose data size is small at the start of the image switching operation. The image data are rewritten by the image rearrangement section 434D, as needed, on predetermined positions of the display image data 434A. At this time, the image rearrangement section 434D arranges the acquired image data on the positions substantially the same as the positions on the composite image data 10 or 50.

On rearrangement of the image data on the display image data 434A, the colors of the display image data 434A and the image data to be arranged are adjusted. This almost corresponds to the function of the aforementioned mask color adjustor 135G, and adjusts the entire color of the display image data 434A to the color substantially the same as that of the image data to be displayed.

The image removing section 434E can remove the image data that is being displayed on the display image data 434A. That is, the image is arranged by the image rearrangement section 434D, and then removed by the image removing section 434E, thereby realizing image switching. The image that has been removed here may be completely removed. Alternatively, it is possible to temporarily store the removed image in the preservation section. This temporary preservation in the preservation section eliminates the need for activating the image selecting section 434B and image reading section 434C when the same image data needs to be used, and makes it possible to promptly call up the image data from the preservation section to arrange the image data on the display image data 434A.

The image color adjustor 434F adjusts the colors of the display image data and the image data to be displayed based on the image color information 111.

[Operations of Image-processing Device According to Fourth Embodiment]

Operations of the image-processing device 430 according to the fourth embodiment will next be described below.

As shown in FIG. 14, the composite image data 10, image position information table 11, and display image information table 14 are read and temporarily stored in the preservation section 132 by the operation from the steps S101 to S102. Then the required composite image data 10, image position information table 11, and display image information table 14 are read.

The image selecting section 434B then reads, from the display image information table 14, the display image information 14B corresponding to the start time, and selects the image ID information 112 described in the image position information table 11 that corresponds to the above display image information 14B (step S403). Alternatively, the image selecting section 434B may select, directly from the image position information 113 described in the image position information table 11, the position information of the image to be displayed.

Based on the position information of the image data recognized in the step S403, the image reading section 434C reads the image data to be displayed in the start time (step S404).

The image data that has been read in the step S404 is arranged on the display image data 434A by the image rearrangement section 434D. At the same time, the color of the display image data 434A is adjusted in order to prevent the disadvantage of the color caused by spaces between the image data. The image color adjustor 434F executes this adjustment based on the image color information 111 described in the image position information table (step S405).

The display controller 133 then displays the display image data 434A on the display section 140 (step S406). At this time, the image in the start time represented by time unit 0 is displayed on the display section 140. At the same time, a timer of the timing section 135H is set to operate. When the timer has reached a predetermined time specified by the time information 14A of the display image information table 14, the image currently being displayed is switched to another image based on the display image information 14B described in the display image information table 14. Note that the time information 14A may represent the aforementioned time unit, that is, time unit corresponding to a clock signal or the like, in addition to the time unit such as hour, minute, second or the like.

Thereafter, it is confirmed whether the image switching operation is executed or not in the step S108. When the image needs to be switched, the image switching operation is executed. When the image need not be switched, stop processing for image switching operation is executed.

When it has been determined, in the step S108, that the image switching operation is executed, the image selecting section 434B selects the image to be displayed next based on the image position information table 11 and display image information table 14 (step S409). Then the image reading section 434C reads, from the composite image data 10 or 50, the image data selected in the step S409 (step S410).

Thereafter, the color of the image to be displayed next and that of the current display image data 434A are compared with each other (step S411). More specifically, in the step S411, the image color adjustor 434F recognizes the color of the image to be displayed next based on the image color information 111 described in the image position information table 11 and the display image information 14B.

When the color of the display image data 434A and that of the image to be displayed next are different from each other, it is determined, in the step S411, that the color must be corrected. In this case, the image color adjustor 434F adjusts the color of the display image data 434A to the general color of the image data to be displayed next. At the same time, the image data item that has been read by the image reading section 434C is arranged on the display image data 434A by the image rearrangement section 434D (step S412).

On the other hand, it has been determined that the color adjustment is not required, the image rearrangement section 434D arranges the image data without color adjustment operation (step S413).

The arrangement of the image data is executed based on the display image information table 14 in the steps S412 and S413. At this time, when the image data is arranged according to the luminance information 14C and lightness information 14D of the display image information table 14, fade-in expression or the like can be realized.

The specified image data that needs to be removed form the display image data 434A is taken out by the image removing section 434E (step S414). As in the case of arranging the image, the image data may be removed gradually or suddenly from the display image data 434A.

The above operations are automatically switched between them at a predetermined time under the control of the timing section 135H. The repetition of the above image data switching operation allows a series of moving pictures to be displayed. When the speed or timing at which the image is switched is controlled, expressions of the moving pictures can be changed. Therefore, the preparation of a plurality of display image information tables 14 to be selected by the user allows various patterns of the moving pictures to be selected and displayed.

When it has been determined, in the step S108, that the image switching operation is not executed, the stop processing for image switching operation is executed (step S114). As a result, the image that is being displayed can continue to be displayed. In this state, the image switching operation can be resumed any time, otherwise, it is possible to terminate the image display (step S115).

[Effects of Image-processing Device According to Fourth Embodiment]

According to the image-processing device used in the fourth embodiment, the following effects can be obtained in addition to the aforementioned effects (1), (6), (7) and (10):

(15) The composite image data 10 is constituted by at least one combination of the constitutional image data 101 that constitute image data different from each other. The controller 436 includes the image acquiring section 434 that acquires the constitutional image data 101 that are included in the composite image data 10 and that correspond to the image data to be displayed, and display controller that allows the constitutional image data 101 acquired by the image acquiring section 434 to be displayed on the display section 140. Thus, it is possible to pick up, from the composite image data 10, only the image data to be displayed without using a filter section such as the mask data, thereby simplifying the configuration of the device.

(16) The constitutional image data 101 that constitute the same image data have the same identification information called image ID information, and the image acquiring section 434 acquires only the constitutional image data 101 having the same identification information. In this manner, by selecting the same image ID information 112 described in the image position information table 11, the same image data can be selected. Therefore, it is possible to determine the image data to be acquired by just describing the image ID information in the image position information table 11, allowing the image to be processed quickly and comfortably.

(17) The composite image data 10 includes, for each image data, image position information 113 indicating the positions of respective constitutional image data 101. Based on the image position information 113, the image acquiring section 434 can acquire the constitutional image data 101 corresponding to the target image data. Thus, the target image data can be acquired directly by recognizing the image position information 113, which makes it possible to quickly acquire information such as the arrangement of the constitutional image data 101 on the original image data, and to display the image data based on the information.

(18) The image color adjustor 434F adjusts the general color of the display image data 434A to the color of the image data that is being displayed. Thus, the color harmony between the image data that is being displayed and the display image data 434A is maintained. Accordingly, the color harmony of the image to be displayed can be achieved, thereby obtaining a good appearance.

Modifications of Embodiments

The present invention is not limited to the above specific embodiments, but includes modifications as long as the objects of the present invention can be attained.

Figure 15:
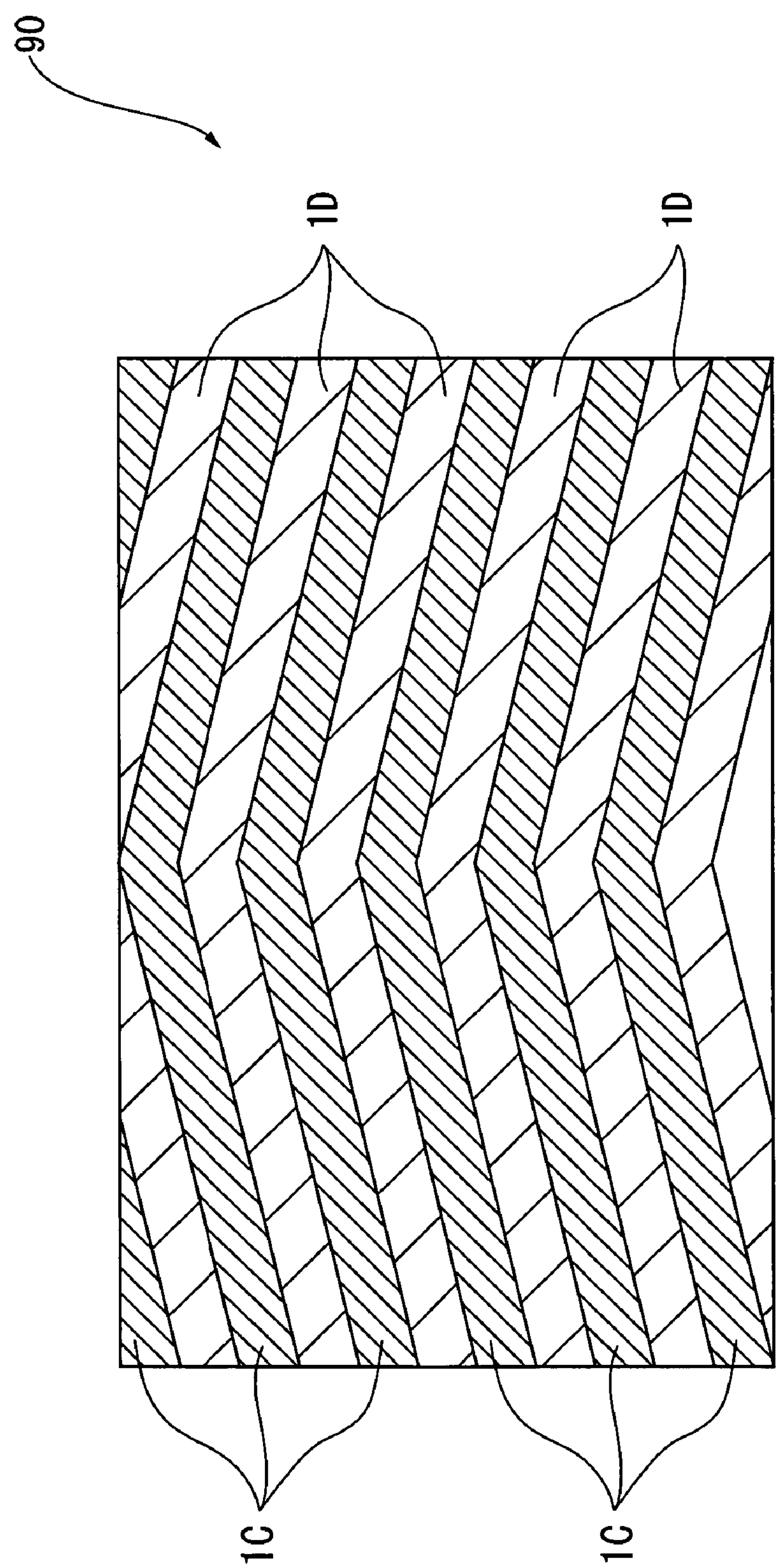
FIG. 15 shows a modification of composite image data according to the first embodiment.

For example, though it is described that the composite image data 10 shown in FIG. 1 includes stripe-shaped data that are horizontally parallel to each other in the first and second embodiments, however it is not limited thereto. The composite image data 10 may include data having various shapes such as stripes extending in a vertical direction or extending in oblique directions as shown in FIG. 15, waved stripes, or combination of these. In this case, if the respective mask cell data 23 of the mask data 20 included in the image acquiring section 134 are correspondingly shaped, image data can be acquired from the composite image data 10 and displayed. For example, in the image-processing device shown in FIG. 15, image data 1C and 1D having reverse-V shaped stripes are alternately arranged to form composite image data 90. By using various kinds of composite image data, the user can enjoy the transition from one image to another.

Figure 16:
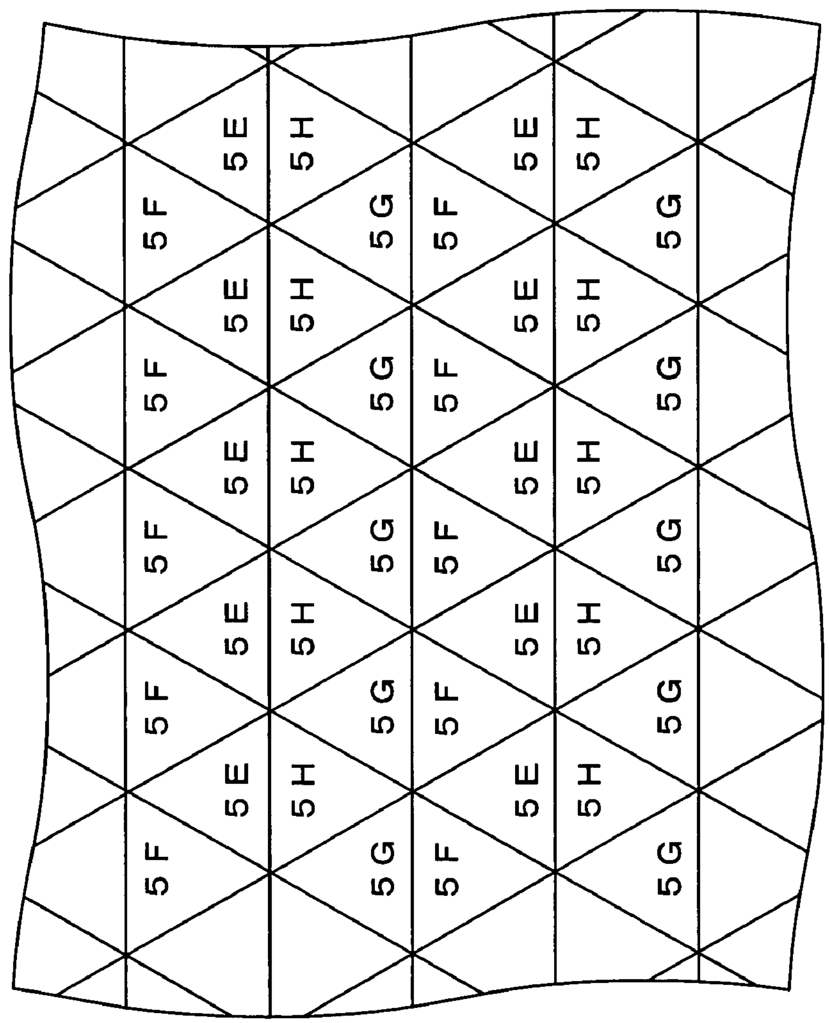
FIG. 16 shows a modification of composite image data according to the third embodiment.

The composite image data 50 in the third embodiment includes square image data alternately arranged in a lattice form. Alternatively, however, polygonal image data may be used. For example, composite image data 900 shown in FIG. 16 including image data 5E, 5F, 5G, and 5H that has been divided into triangular-shape and alternately arranged may be used. As described above, the image-processing device can use the various shapes of image data that constitute the composite image data to switch the images.

By using various shapes of the image data, different variations in the expression of moving picture, in particular, transition from one image data to another can be seen. Thus, it is possible to select the shape of the image data in accordance with the image or the like of the respective image data.

Further, in the first to fourth embodiments, the composite image data 10 or 50 is formed by alternately arranging the subdivided image data. Alternatively however, the subdivided image data may be arranged irregularly. In this case, the positions of the image data are described in the image position information 113 of the image position information table 11. To display the specified image data, firstly, the image ID information 112 of the image data to be displayed is determined. Then the image position information 113 corresponding to the image ID information 112 is read. Finally the read image data is displayed on the display section. In the above composite image data, image data are randomly divided and arranged, so that the composite image data can easily be constituted.

For image switching, the image acquiring section according to the first to third embodiments uses a mask data, and the image acquiring section according to the fourth embodiment reads the image data to be displayed from the composite image data and rearranges the read image data, however, it is not limited thereto. Alternatively, the image acquiring section may switch the images by adjusting the luminance or lightness of the image data itself or the transmittance of the image data itself to switch the images. This configuration can eliminate the mask data 20 or 60, mask controller 135, image rearrangement section 434D, display image data 434A or the like, thereby simplifying the configuration of the image-processing device.

The image acquiring section may use other methods to switch the images. That is, the image acquiring section may have any configuration, as long as the image acquiring section acquires predetermined image data from the composite image data to display the acquired image data, and does not allow other image or images to be displayed.

In the first and second embodiments, the image acquiring section 134 or 230 uses mask data 20 as an image filter to allow a part of the composite image data 10 to be visible, and to obscure the residual area, however it is not limited thereto. Alternatively, however, in the image-processing device having a plurality of sets of the constitutional image data 10 having different arrangement states, a plurality of mask data to be superposed on the composite image data 10 may be switched by the mask controller. In this case, by controlling each of the mask data, it is possible to cope with the case where the composite image data 10 includes many image data. Further, the above individual control over the mask data allows the order or speed of image switching to be freely and easily set.

In the first to third embodiments, the image color recognizer 135F recognizes the image color information of the image data that is being displayed and the image data to be displayed next, and then the mask color adjustor 135G adjusts the color for each cell of the image data, however, it is not limited thereto. Alternatively, the mask color adjustor 135G may adjust the general color of the mask data. Further, in the case where the general color of the image data that is being displayed is substantially the same as that of the image data to be displayed next, it is possible to keep the color of the mask data 20 or 60 unchanged. The configuration as described above, in which the general color of the mask data can be adjusted or the color of the mask data can be kept unchanged, further simplifies the structure of the image-processing device.

In the first to third embodiments, the mask data 20 or 60 is generated by the mask generating section 135C or 235C, however, it is not limited thereto. Alternatively, the mask data 220 including the mask cell data 23, first mask data 21, or second mask data 22 may be created in advance and the mask data 20 or 60 may be superposed, as needed, based on the image position information 113 of the image position information table 11. Although the shapes of the cells of the image data in the composite image data must be the same, the configuration in which the mask data is previously created can eliminate the mask generating section 135C or 235C, thereby simplifying the structure of the image-processing device.

In the first to fourth embodiments, the image display device 100, 200, or 400 includes the storage section 110 and display section 140, however, it is not limited thereto. Alternatively, the storage section 110 and display section 140 may be independently provided from the image display device 100, 200, or 400. This configuration allows an additional provision of a large-capacity storage section, and installation of a plurality of display sections at points distant from the image-processing device.

In the first to fourth embodiments, the image display device 100 includes the image compositing section 120, and the image compositing section 120 combines a plurality of image data to form the composite image data 10, however, it is not limited thereto. Alternatively, the composite image data 10 may be created by an external device, and the created composite image data 10 may be stored in the storage section 110. Separation of the image compositing section 120 from the image display device 100 simplifies the structure of the image display device 100, and accordingly assures free space in the storage area.

Further, the image compositing section 120 may be installed on a server that constitutes a network such as the Internet or the like. In this case, a plurality of image data existing in terminal devices are sent to the image compositing section via the network. Then the composite image data that has been created by the image compositing section is sent back to the terminal devices. This configuration is effective, in particular, for the terminal device that is as small as a mobile phone, and cannot assure enough space to store the image compositing section due to the necessity of storing other systems and programs. Thus, installation of the image compositing section via the network makes it possible to easily create the composite image data.

In the first embodiment, the mask position information tables 12 are provided both for the first mask data 21 and second mask data 22, however, it is not limited thereto. Alternatively, for example, the mask position information tables 12 may be so formed as to correspond to the respective image data 1A and 1B. In this case, the mask position information tables 12 may describe only the type of mask data to be superposed on the image data at a predetermined time. In the case of the second mask data, transmittance information of the mask is added to the above. The use of the above mask position information table makes a state of the image data at a predetermined time more understandable. Therefore, by focusing on one image data, it is possible to easily edit the transition of the same image data.

In the first to fourth embodiments, the operation state between the steps S108 and S113 is displayed on the display section, however, it is not limited thereto. Alternatively, only the processing result obtained from the operation between the steps S108 and S113 may be displayed. In this case, the transmittance of the second mask data 22 need not be changed gradually, but may be suddenly changed. Further the mask position information table 12 may include information indicating whether the image data that is being processed is allowed to be displayed or not. In this case, display state can be switched depending on the user's taste or type of image data.

In the image display device according to the fourth embodiment, the image data is acquired from the composite image data 10 or 50, and the acquired image data is then arranged on the display image data 434A so as to be located at the substantially same position as that at which the image data has been arranged on the composite image data 10 or 50, however, it is not limited thereto. Alternatively, the acquired image data may be arranged such that the space between the image data is narrowed or is removed. Further, the composite image data may be formed by vertically and horizontally arranging a plurality of image data in a random order, and the specified image data may be read from the composite image data thus formed. This configuration eliminates the space between the image data, thereby displaying a fine image.

[Advantages of Embodiment]

The image-processing device 130 includes the data access section 131 that reads the composite image data 10 having one data structure in which a plurality of image data are combined, and the controller 136 that selects, from the composite image data 10, the image data to be displayed to display only the selected image data on the display section 140. Thus, it is possible to organize a plurality of image data into one composite image data 10, thereby significantly reducing the image data size and allowing a plurality of image data to be displayed easily.

What is claimed is:

1. An image-processing device comprising:

a reading section for reading a composite image that is formed by combining a plurality of images, the images being respectively formed by a plurality of data pixels or by a plurality of pixel blocks in each of which a plurality of pixels are included, the composite image being structured such that the pixels or the pixel blocks of the images to be combined are arranged in a predetermined order; and a controller that superposes a filter section on pixels or pixel blocks for forming a predetermined image or images of the images among the pixels or the pixel blocks of the images, the controller controlling a display section to display the filter section that has been superposed on the pixels or pixel blocks for forming the predetermined image or images while controlling the display section to display pixels or pixel blocks on which the filter section is not superposed; and a filter controller that switches the pixels or the pixel blocks on which the filter section is superposed so as to control the pixels or the pixel blocks displayed on the display section to be switched.

2. The image-processing device according to claim 1, wherein the composite image is formed by combining at least a portion of the plurality of pixels for forming the images or of the plurality of pixel blocks for forming the images, and the controller includes an image acquiring section that acquires, the pixels or the pixel blocks that correspond to the image to be displayed, and a display controller that allows the pixels or the pixel blocks acquired by the image acquiring section to be displayed on the display section.

3. The image-processing device according to claim 2, wherein the pixels or the pixel blocks have the same identification information for each image, and the image acquiring section acquires only the pixels or the pixel blocks that have the same identification information.

4. The image-processing device according to claim 2, wherein the composite image has position information indicating positions of the pixels or the pixel blocks corresponding to the images, and the image acquiring section acquires the pixels or the pixel blocks corresponding to the images based on the position information.

5. The image-processing device according to claim 1, wherein the filter controller switches the pixels or the pixel blocks on which the filter section is superposed by moving the filter section as needed to change a displayed state of the image to be displayed on the display section.

6. The image-processing device according to claim 5, wherein the images each are structured such that a plurality of longitudinal pixel blocks are arranged in substantially a striped manner therein, the composite image is structured such that pixel blocks or different images are alternately arranged therein, the filter section has a stripe-shaped structure so as to be superposed on the pixel blocks corresponding to the predetermined image or images of the composite image, and the filter controller moves the filter section substantially along an arranging direction of the pixel blocks.

7. The image-processing device according to claim 1, wherein the filter section includes a plurality of filter sections that correspond to the plurality of pixels or the plurality of pixel blocks for forming the images, and the filter controller switches superposed states of the plurality of filter sections superposed on the pixels or the pixel blocks.

8. The image-processing device according to claim 1, wherein the filter controller controls the filter section to change the degree of transmittance at which the pixels or the pixel blocks on which the filter section is superposed are viewed through the filter section.

9. The image-processing device according to claim 8, wherein the filter controller successively changes the degree of the transmittance.

10. The image-processing device according to claims 1, wherein the filter controller sets a color of the filter section to be substantially the same color as those of the pixels or the pixel blocks that are not superposed by the filter section.

11. The image-processing device according to claims 1, further comprising a composite image generating section that acquires the plurality of images and combines the acquired images to generate the composite image having one data structure.

12. The image-processing device according to claim 11, wherein the composite image generating section generates the composite image such that a size of the composite image substantially corresponds to a size at which the image is displayed on the display section.

13. An image-processing method comprising:

reading a composite image that is formed by combining a plurality of images, the images being respectively formed by a plurality of pixels or by a plurality of pixel blocks in each of which a plurality of pixels are included;

superposing a filter section on some of the pixels or pixel blocks of the read composite image;

displaying on a display section the filter section having been superposed on the some of the pixels or pixel blocks while displaying on the display section pixels or pixel blocks on which the filter section is not superposed; and switching the pixels or pixel blocks on which the filter section is superposed.

14. A computer-readable recording medium storing an image-processing program in a manner readable by a computer, the image-processing program controlling a computing section to execute an image-processing method that comprises: reading a composite image that is formed by combining a plurality of images the images being respectively formed by a plurality of pixels or by a plurality of pixel blocks in each of which a plurality of pixels are included, superposing a filter section on some of the pixels or pixel blocks of the read composite image; displaying on a display section the filter section having been superposed on the some of the pixels or pixel blocks while displaying on the display section pixels or pixel blocks on which the filter section is not superposed; and switching the pixels or pixel blocks on which the filter section is superposed.

* * * * *